(12) United States Patent
Leahy et al.

(10) Patent No.: US 7,371,978 B2
(45) Date of Patent: May 13, 2008

(54) THERMALLY INSULATED WEIGHING MODULE

(75) Inventors: Tom Leahy, Castelsaarasin (FR); Gregory Queen, Pickerington, OH (US); Helmut Bäumel, Greifensee (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 11/482,155

(22) Filed: Jul. 7, 2006

(65) Prior Publication Data

US 2008/0006451 A1    Jan. 10, 2008

(51) Int. Cl.
*G01G 21/28* (2006.01)

(52) U.S. Cl. ............. 177/238; 73/862.622; 177/DIG. 9
(58) Field of Classification Search ................ 177/229, 177/238, DIG. 9; 73/862.622
See application file for complete search history.

(56) References Cited

U.S. PATENT DOCUMENTS

| | | | | |
|---|---|---|---|---|
| 2,714,536 A | * | 8/1955 | Wirth | 403/121 |
| 3,915,248 A | * | 10/1975 | Paelian | 177/210 R |
| 4,258,810 A | * | 3/1981 | Susor | 177/128 |
| 4,411,327 A | * | 10/1983 | Lockery et al. | 177/211 |
| 4,483,404 A | * | 11/1984 | Weihs | 177/255 |
| 4,638,876 A | * | 1/1987 | Balduin et al. | 177/139 |
| 4,744,254 A | * | 5/1988 | Barten | 73/862.622 |
| 4,880,069 A | * | 11/1989 | Bradley | 177/211 |
| 5,929,390 A | * | 7/1999 | Naito et al. | 177/211 |
| 6,173,619 B1 | * | 1/2001 | Satake et al. | 73/862.622 |
| 6,320,142 B1 | * | 11/2001 | Burton et al. | 177/132 |
| 6,924,441 B1 | * | 8/2005 | Mobley et al. | 177/144 |
| 7,202,425 B2 | * | 4/2007 | Knudsen et al. | 177/211 |

FOREIGN PATENT DOCUMENTS

| | | |
|---|---|---|
| DE | 37 43 356 A1 | 6/1989 |
| EP | 1 275 943 A2 | 1/2003 |

\* cited by examiner

*Primary Examiner*—Randy W Gibson
(74) *Attorney, Agent, or Firm*—Buchanan Ingersoll & Rooney PC

(57) ABSTRACT

Weighing module having a first mounting device which is in force-transmitting contact with a load that is to be determined, also having a second mounting device which is connectable to a supporting structure that supports the weighing module. A load cell is arranged between the mounting devices and cooperates with a load-transmitting device. The weighing module has a first and a second receiving cup, each of which has a concavity designed to receive the force-transmitting element, which receiving cups are arranged between the mounting devices. At least one concavity has an elliptical cross-section in a plane that is substantially orthogonal to the direction of the load.

16 Claims, 5 Drawing Sheets

THERMALLY INSULATED WEIGHING MODULE

BACKGROUND

A weighing module for a load cell that is to be installed in the weighing module is disclosed.

Weighing modules can be used in diverse fields of application, depending on the type of load cell being used and on the desired load range. Weighing modules with high-capacity load cells are used primarily to determine the weight and to weigh the contents of high-volume containers, silos, tanks, reactor vessels and/or reaction containers. The weighing of the contents can be accomplished by way of a differential weighing of the container in the empty condition and after it has been filled. Weighing modules of the type described herein can also be used under extreme ambient conditions such as for example in an open-air environment, in a technical facility or in a production plant.

Commercially available weighing modules include among others the models "Centerlign™" and "Flexmount™" by Mettler Toledo. The Centerlign™ device includes a beam-shaped load cell. The Flexmount™ device represents a weighing module with a beam-shaped weighing cell and has a lift-off safety feature. A weighing cell is arranged between two mounting devices which are designed so that the weighing module can be installed between a load and a supporting structure. Beam-shaped load cells are load cells with an elongated shape. One end of the beam-shaped load cell is immovably connected to the weighing module and the other end is arranged to allow displacement under load. Besides weighing modules with beam shaped load cells there are also modules with rocker pin load cells available.

A weighing module with a beam-shaped load cell is disclosed for example in EP 1 275 943 A2, wherein the load cell cooperates with a pin-shaped or ball-shaped force-transmitting element.

The conventional weighing modules are protected primarily against mechanical damage to the weighing module and/or to the load cell. They include lift-off safety devices and/or overload safety devices with the purpose of preventing a destructive separation of the mounting devices as well as preventing a destruction of the load cell for example under excessively heavy loads. The known prior art further includes a variety of means for the alignment and/or the limitation of the free play of the weighing module and in particular of the mounting devices in relation to the load cell and to each other.

Besides an incorrect alignment of the weighing module, there are also other factors that can have an influence on the weighing result. These factors include, among others, impact forces in a horizontal plane as a result of oscillations of the container caused by, for example, stirring mechanisms inside the container and temperature fluctuations and/or temperature changes which can occur on the one hand as a result of a change in the outside temperature and/or the room temperature, but also when the container to be weighed warms up and/or cools down. If the container to be weighed is heated or cooled, for example when a chemical reaction is carried out, the thermal expansion of the container can cause a change in the container dimensions.

A weighing module arrangement and/or the individual weighing modules should therefore have the capability of restricting oscillations of the weighing container in a horizontal plane while accommodating its thermal expansion and contraction as a result of a temperature change. The individual weighing modules should on the one hand be intrinsically rigid to allow them to carry the load of the container to be weighed and to restrict its oscillations, and they should on the other hand have sufficient mobility to allow unhindered expansion of the weighing container and absorb extraneous forces without compromising the proper function of the load cell and/or of the weighing module, and also without allowing the container to tip over.

To weigh large-volume containers one uses a weighing module arrangement with several weighing modules which differ from each other in their respective degrees of mobility. For example, one fixed module is used together with two or more modules that allow movement. The play of the weighing modules is often delimited by complex means which, for example, require an exact alignment or which cause friction forces to occur between the load cell and the means for delimiting the play. When friction forces are present, they can cause for example the application of extraneous side forces to the load cell, whereby the weighing accuracy is degraded, or an abrasion of material, whereby the function of the delimiting means can be altered.

SUMMARY

A weighing module with a free play that is simple to adapt to the desired requirements is disclosed.

A weighing module as described herein can be stable as well as intrinsically flexible. A weighing module as described herein can have a position-restoring effect or position-restoring force, so that it has the capability to take up extraneous forces when they occur and to return to a base position after the activity of the extraneous forces has subsided.

An exemplary weighing module has a first and a second mounting device. The first mounting device is in force-transmitting contact with a load that is to be measured, for example a container that is to be weighed, and the second mounting device can be connected with a structure that supports the weighing module. The supporting structure can be, for example, the floor of a factory building, the ground, a suitable understructure or also a table, depending on the nature of the loads for which the weighing module is designed and depending on the tasks that it needs to perform. A force acting on the weighing module can be transmitted through one of the mounting devices to a load cell that is arranged between the two mounting devices and is in force-transmitting contact with a force-transmitting element. The weighing module has a first and a second receiving cup, each with a concavity that serves to receive the force-transmitting element, wherein the receiving cups are arranged between the mounting devices. The respective concavities of the first and/or the second receiving cup are shaped with an elliptical cross-section in a plane that extends orthogonal to the load direction. The term concavity refers here to a concave depression in the receiving cup.

It is a simple matter to delimit and/or change the mobility of a weighing module that is configured in this manner, due to the at least one concavity with an elliptical cross-section, such as if several weighing modules are used to weigh a load. The weighing module thus has the capability to allow unhindered thermal expansion and contraction, restrict oscillations in a horizontal plane and absorb the effects of extraneous disturbing forces without compromising the functionality or without allowing a tipping of the load, for example a container that is to be weighed. Depending on the shape of the load to be weighed or the shape of the container, modules with different degrees of mobility are combined with each other, such as in weighing module arrangements. One module that has no play can be used together with at least two modules that allow movement.

Depending on its configuration, a weighing module can accommodate different types of load cells with different load ranges. Preferably, the load cells that can be used have an elastically deformable body equipped with strain gauges and can be configured as a single-ended beam load cell or also as a rocker pin load cell.

In a weighing module the load cell cooperates with a force-transmitting element which in an exemplary embodiment has a spherical shape and establishes the force-transmitting contact between the first mounting device and the load cell. This exemplary embodiment can be well suited in the case where the weighing module is configured for a beam-shaped load cell.

In another exemplary embodiment, the load cell and the force-transmitting element form a unit that has two convex spherical end surfaces of the same or different geometrical shapes. A rocker pin load cell of the known state of the art represents an example for such a unit with symmetrical convex spherical surfaces.

The receiving cups, e.g., their shape and size, can be adapted to the desired load cell and the force-transmitting element. To allow the force-transmitting element to be arranged with mobility in the receiving cups, the radius of the concavity in the receiving cups can be larger than the radius of the part of the force-transmitting element that is arranged in the concavity.

The elliptical cross-section of the concavity of the first and/or the second receiving cup prescribes a preferred direction of displacement for the force-transmitting element, and in relation to the weighing module it limits the horizontal play between the mounting devices in the directions orthogonal to the direction of displacement. A displacement remains only possible along the longitudinal axis of the elliptical concavity, if one receiving cup is configured with an elliptical concavity and the other with a circular-shaped concavity.

If a weighing module has two receiving cups, each with a concavity of circular cross-section, the force-transmitting element can be deflected in all directions and could thus be said to be freely movable.

If one receiving cup in a weighing module has a concavity of elliptical cross-section and the other receiving cup has a concavity of circular cross-section, or if both receiving cups have elliptical concavities which are arranged parallel to each other with regard to the longitudinal axes of the concavities, the force-transmitting element is limited to a deflection along the longitudinal axis of the elliptic concavity. The weighing module has limited mobility in this case.

If a weighing module has two receiving cups of elliptical cross-section whose longitudinal axes are rotated relative to each other by a certain angle, such as by 90°, the mobility of the force-transmitting element is further constrained or even almost totally blocked in the case of a 90° angle. Accordingly, the latter weighing module is a fixed weighing module.

The first and/or the second receiving cup can be set at several predetermined angles in reference to the longitudinal axis of its elliptic concavity, so that the direction of the deflection of the force-transmitting element in relation to the load cell or the weighing module can be altered. Thus, for example a fixed weighing module can be converted into a limited-mobility weighing module simply by rotating the receiving cup with an elliptic concavity and fixating it again in the new position.

The first receiving cup in an exemplary embodiment is connected to the top mounting device and the second receiving cup is formed at the load cell. This arrangement is advantageous because it allows the overall height of the weighing module to be reduced and makes the weighing module more stable.

In yet another exemplary embodiment, the load cell and the force-transmitting element form a unit that has two convex spherical end surfaces which are either of the same or different geometric shapes. A state-of-the-art rocker pin load cell with identically shaped spherical end surfaces represents an example for this kind of a unit. This load cell is arranged preferably between two receiving cups, each of which is connected to one of the two mounting devices. A weighing module of this kind does not have a preferred orientation for its installation so that either of the mounting devices can be connected to the load.

In an exemplary embodiment, a weighing module arrangement that has at least three weighing modules with load cells to be accommodated inside them is used for determining a mass or a physical quantity of a load that can be derived from the mass, wherein the load is rigidly connected to the at least three weighing modules. For example, a load can be a container and/or its contents. The principal direction of deflection of the individual weighing modules that form a weighing module arrangement can be prescribed at the outset, with a fixed weighing module being used as a fixed anchoring point.

BRIEF DESCRIPTION OF THE DRAWINGS

Details of the exemplary weighing modules are set forth in the description of the embodiments in conjunction with the drawings, wherein.

DETAILED DESCRIPTION

Figure 1:
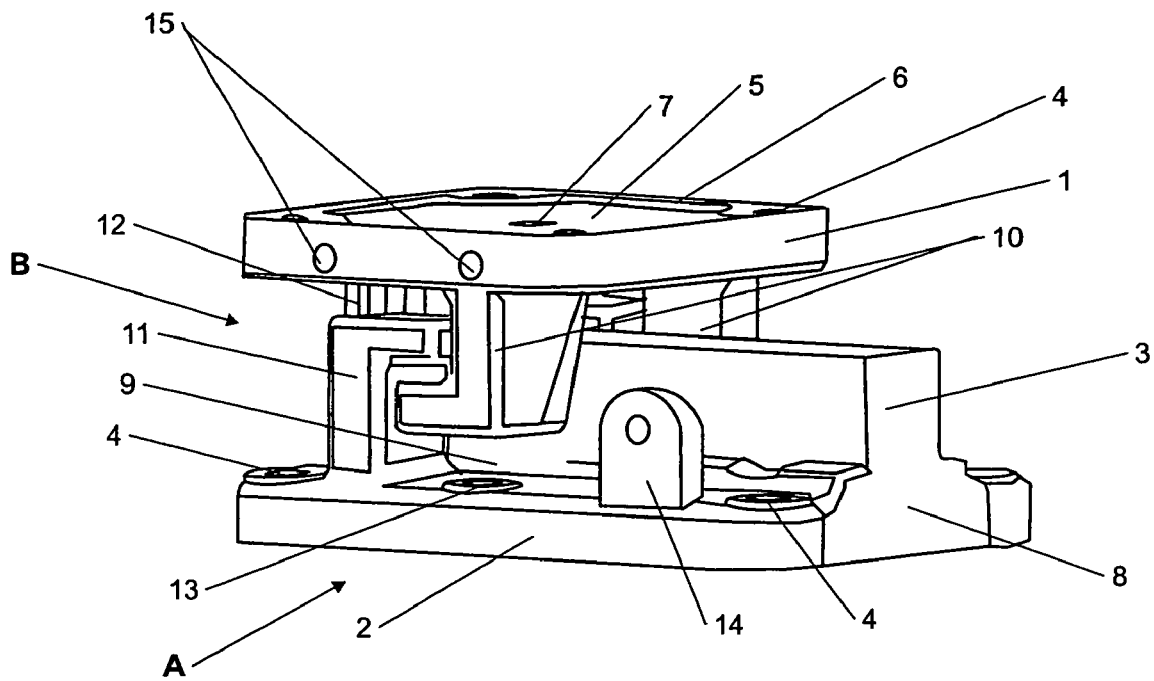
FIG. 1 represents a simplified three-dimensional view of an exemplary weighing module.

FIG. 1 represents a simplified three-dimensional view of an exemplary weighing module as described herein. The weighing module has two substantially plate-shaped mounting devices 1, 2 and a beam-shaped load cell 3 arranged between the mounting devices 1, 2. The load cell 3 can be any kind of beam-shaped load cell or a dummy load cell. The use of a dummy is advantageous primarily during transport and/or installation of the weighing module. When in operation, the weighing module is preferably oriented so that the first mounting device 1 is in contact with a load that is to be measured and the second mounting device 2 is connected to a supporting structure.

When in operation, the first mounting device 1 is in force-transmitting contact with a load that is to be measured. To fasten the weighing module to the load and/or to the supporting structure, the mounting devices 1, 2 have at each corner an opening 4 for a suitable fastening means. An exemplary mounting device 1 that is in contact with a load is shown in FIG. 3, and a mounting device 2 that is connected to a supporting structure is shown in FIG. 4.

On the side that faces away from the load cell, the mounting device 1 has one large surface depression 5 extending over nearly the entire top surface of the mounting device 1. The surface depression 5 is delimited by a ridge 6 around its perimeter, wherein the top of the ridge represents the contact surface to a fastening device for the load.

Figure 2:
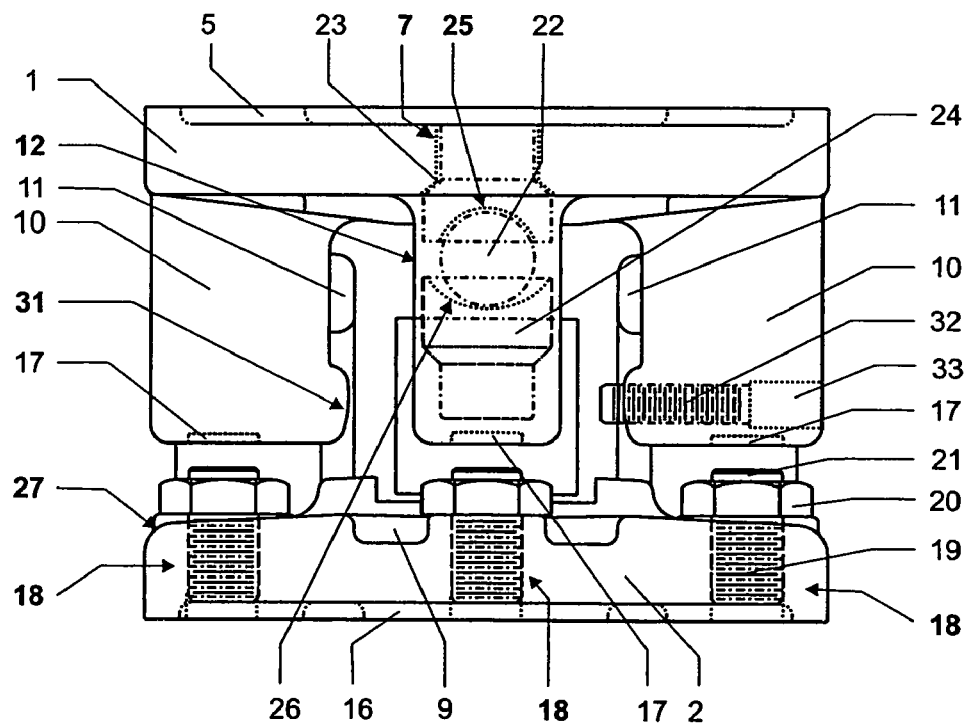
FIG. 2 represents the exemplary weighing module of FIG. 1 as viewed in the direction B in a simplified end view.
Figure 3:
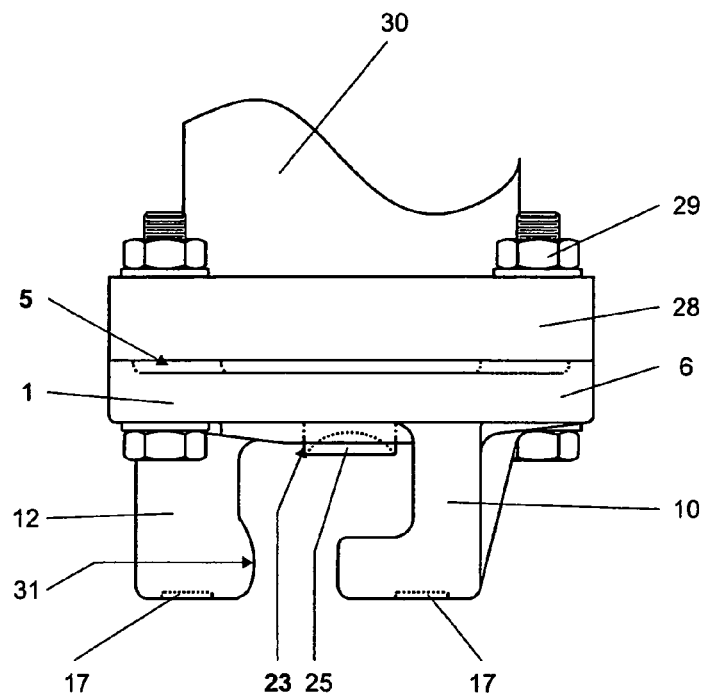
FIG. 3 represents a simplified side view (in the direction A as indicated in FIG. 1) of a first mounting device that is connected to a fastening device.
Figure 4:
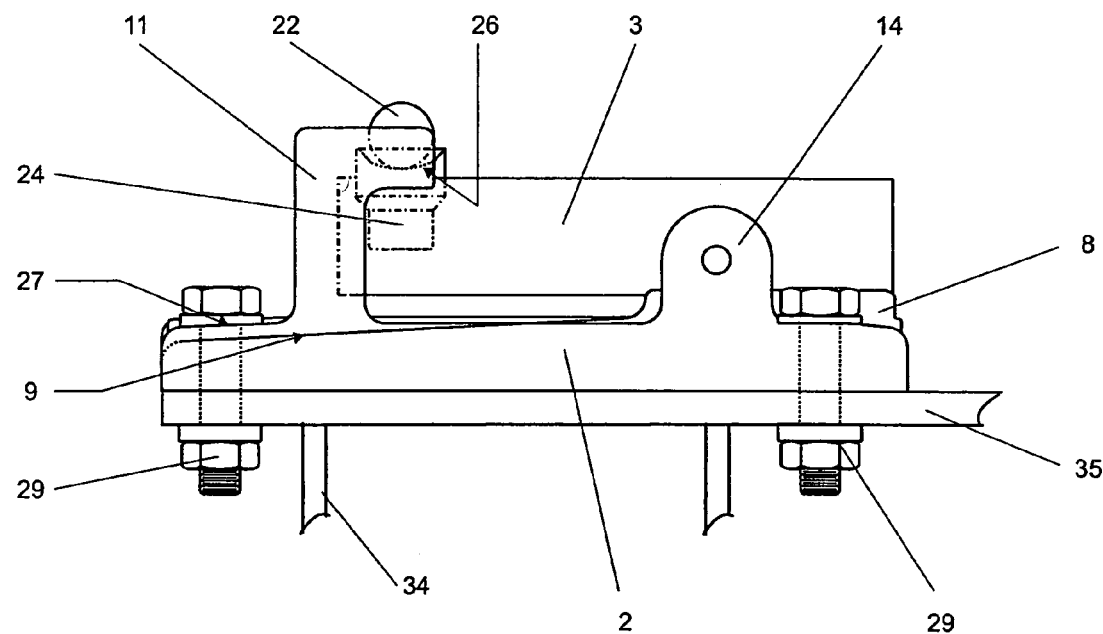
FIG. 4 represents a simplified side view (in the direction A as indicated in FIG. 1) of a second mounting device that is connected to a fastening device.

A further passage opening 7 is provided approximately in the center of the surface depression 5, serving to fasten a receiving cup for a force-transmitting means that is in force-transmitting contact with the load cell 3 (see also FIGS. 2 and 3). The location of the opening 7 depends primarily on the way in which the load cell 3 is oriented and arranged within the weighing module.

In the operating state, the second mounting device 2 is connected to a supporting structure and is likewise equipped with an opening 4 at each corner for a suitable fastening means.

Arranged on the side of the mounting device 2 that faces towards the load cell 3 is a mounting base 8 on which the load cell 3 is fastened. The load cell 3 is oriented so that one end is in fixed connection with the mounting base 8. The other end is free to deflect in the direction of the load and is arranged to keep a certain distance from the mounting device, wherein the distance is determined on the one hand by the height of the mounting base 8 and on the other hand by the depth of an installation aid 9. The installation aid 9 is shaped as a channel-like depression in the mounting device 2, sloping downward from the mounting base 8 to the opposite edge of the mounting device 2. This facilitates the installation or exchange of the load cell 3 in an assembled weighing module.

In the operating state, the force-transmitting element (not visible here) establishes the force-transmitting contact between the two mounting devices 1, 2. The weighing module has several different safety features that serve to limit the horizontal and vertical play of the mounting devices 1, 2 in relation to each other.

A lift-off safety device is arranged between the two mounting devices 1, 2, having a plurality of parts, in this example hook-shaped means 10, 11 that mutually engage each other. Two hooks 10 are connected to the first mounting device 1 and two further hooks 11 are connected to the second mounting device 2. The hooks 10, 11 engage each other in pairs, with the load cell 3 being arranged between the two hook pairs 10, 11.

As another exemplary safety feature, the weighing module has an overload safety device 12 connected to the first mounting device 1, as can be seen more clearly in FIGS. 2 and 3. The hook pairs 10, 11 and the overload safety device 12 limit the horizontal play of the mounting devices 1, 2 relative to each other.

Besides the openings 4 for the fastening of the weighing module to a supporting structure, the second mounting device 2 also has three further openings 13, only one of which is visible in this view. These openings 13 can receive vertical limiting means which can cooperate with the hooks 10 (in the drawing directly above the openings 13) and with the overload safety device 12. The arrangement and function of the vertical limiting means will be explained in more detail in the context of FIGS. 2 and 5.

To weigh a container with a stirring mechanism or under adverse ambient conditions, a transverse guide element as known from the state of the art can be installed for the compensation of torques and side loads which can occur under these conditions. For the attachment of a transverse guide element, the second mounting device 2 has a fastening block 14 and the first mounting device 1 has at least one fastening device which is configured here in the form of two bore holes 15.

FIG. 2 shows a simplified end view B of the exemplary weighing module of FIG. 1. As can be clearly seen in this view, the first mounting device 1 and the second mounting device 2 each have a depression 5, 16 on the side that faces away from the load cell 3. These depressions have the purpose to provide thermal insulation of the weighing module from the load and/or the supporting structure.

The hooks 10 connected to the first mounting device 1 as well as the overload safety device 12 each have recesses 17 at their free ends, which can cooperate with vertical limiting means 18 that are arranged in the second mounting device 2. The size of the recess 17 is adapted to the vertical limiting means 18.

One vertical limiting means 18 is arranged in the second mounting device 2 under each of the hooks 10 and under the overload safety device 12. A vertical limiting means 18 having three functional parts, i.e., an anchoring seat 19 which is arranged substantially in the second mounting device 2, a head 20 with an enlarged cross-section compared to the anchoring seat 19, and with a limit stop 21 facing towards the first mounting device 1. For example a screw with a head or a threaded rod with a suitable nut can be used as limiting means 18. The limiting means 18 are preferably designed to be adjustable so that the height of the part of the limiting means 18 that protrudes from the second mounting device 2 can be changed and the vertical play of the two mounting devices relative to each other can be adjusted.

The limiting means 18 serve not only as a limit stop for the overload safety device 12 and hooks 10 but can also cooperate with them and thus define or even fixate for example a rest position of the weighing module if the play between the two mounting devices 1, 2 is eliminated through the adjustable limiting means 18.

The force-transmitting element 22 which cooperates with the load cell 3 is arranged between the hook pairs 10, 11 and the overload safety device 12 as well as between the second mounting device 2 and the load cell 3. The force-transmitting element 22 can be any of the known load receivers, but also, as shown here, a spherical element that is movably seated in two receiving cups 23, 24. The force-transmitting contact between the two mounting devices 1, 2 is established only through the load cell 3 and the force-transmitting element 22 which is free to move within the receiving cups 23, 24.

The receiving cup 23 is connected to the first mounting device 1, and the receiving cup 24 is connected to the load cell 3. Each of the receiving cups 23, 24 has a concavity 25, 26 which can have a circular or elliptical cross-section. The receiving cup 23 in this example has a concavity 25 with an elliptical cross-section, wherein the longitudinal axis of the concavity 25 runs perpendicular to the plane of the drawing. The receiving cup 23 can be locked in place in the receiving hole 7 in the first mounting device. Preferably, the receiving hole 7 as well as the end of the receiving cup 23 that mates with the receiving hole 7 are designed with a polygonal cross-section, such as in a symmetric shape, i.e., a square or regular hexagon, so that the receiving cup 23 can be arranged in one of several fixed positions, which in turn allows the direction of the deflection of the force-transmitting element 22 to be prescribed in the case where this receiving cup has an elliptical concavity.

The other receiving cup 24 can be either rigidly connected to the second mounting device 2 and/or designed for fixation in several angular positions or, as a means of reducing the overall height of the weighing module, the receiving cup 24 can be configured on the load cell 3 and/or integrated in the latter. The concavity 26 in the receiving cup 24 is designed with a circular shape. Due to the different geometrical shapes of the receiving cups 23, 24, the mobility of the spherical force-transmitting element 22 is constrained and its deflection is limited to a preferred direction, i.e., along the longitudinal axis of the elliptical concavity 25.

To set and/or limit the horizontal play of the two mounting devices 1, 2 relative to each other, the hooks 10, 11 as well as the overload safety device 12 include fixed horizontal limiting means 31 and/or adjustable horizontal limiting means 32. The fixed limiting means 31 in the present example are simple limit stops which have been shaped directly as a part of the hook 10. An adjustable limiting means 32 can be for example a set screw or a threaded rod which runs in a hole 33 that is arranged perpendicular to the load direction. The hooks 10, 11 as well as the overload safety device 12 can be designed either with fixed horizontal limiting means 31 or with adjustable horizontal limiting means 32, where adjustable liming means 32 allow the adaptation of the weighing module to different external conditions.

FIG. 2 further illustrates the channel-shaped installation aid 9 and a drainage feature. The surface 27 of the second mounting device 2 which faces towards the load cell 3 is designed as a drainage surface which, in reference to the illustrated situation, slopes down towards the outside, so that moisture and/or fluids falling on the second mounting device 2 are quickly drained off. A comparable function is also served by the installation aid 9.

FIG. 3 shows a simplified side view of an exemplary first mounting device 1 in an orientation corresponding to the view in the direction A of FIG. 1. Two hooks 10 (with only one of them being visible in this view), the overload safety device 12 with a fixed horizontal limiting means 31, and a receiving cup 23 with an elliptical concavity 25 are arranged on the first mounting device 1. The side of the mounting device 1 which in the operating state faces away from the load cell has a surface depression 5 serving for the thermal insulation of the weighing module. The surface depression 5 is delimited by a ridge 6 around its perimeter, wherein the top of the ridge represents the contact surface for a fastening device 28.

The fastening device 28 can for example be a flange whose dimensions are matched to the mounting device 1. The fastening device 28 closes off the depression 5 at the top (in reference to the drawing), whereby an enclosed hollow space is formed. This hollow space can include for example a vacuum or a standing air cushion, or it can also be filled with a material of a defined thermal conductivity, with a standing air cushion being preferred.

The fastening device 28 is connected to the first mounting device 1 through suitable fastening means 29. Preferred is the use of four fastening means 29 arranged, respectively, at the corners of the mounting device 1 (also see FIG. 1). These means can include screws with one nut each, but also threaded rods with two nuts or other known means for the fastening of flanges. The fastening device 28, in turn, is connected to a load 30 shown here as the base of a container that is to be weighed.

FIG. 4 shows a simplified side view of an exemplary second mounting device 2 as seen in the direction A of FIG. 1. In the interest of clarity, the vertical limiting means (see FIG. 2) are not shown in this view.

The second mounting device 2 has two hooks 11, only one of which is visible here, a fastening block 14 for a transverse guide element, and a channel-shaped installation aid 9 which from the mounting base 8 slopes downward towards the left side in reference to the drawing. The top surface 27 of the second mounting device 2 facing towards the load cell is shaped so that it slopes downward on all sides. The load cell 3 is connected to a receiving cup 24 with a circular concavity 26 which can receive a spherical force-transmitting element 22.

In the operating state, the second mounting device 2 is connected to a supporting structure 34 which preferably has a flange serving as fastening device 35. The mounting device 2 is connected to the fastening device 35 through suitable fastening means 29. The second mounting device 2 can, like the first mounting device, be configured either with a means of thermal insulation or without it as illustrated here for the second mounting device 2.

Figure 5:
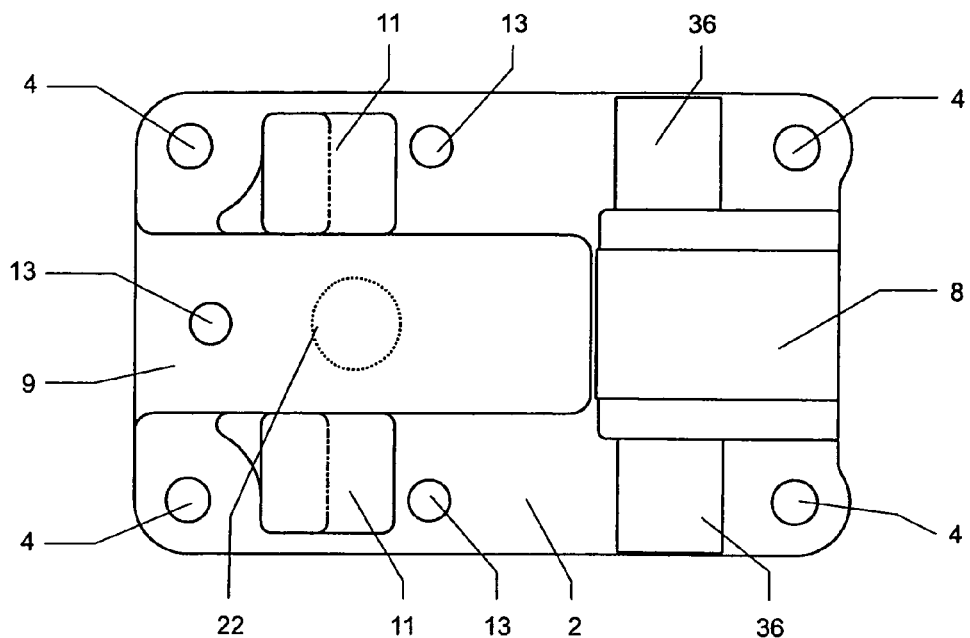
FIG. 5 represents a simplified top view of a second mounting device of an exemplary weighing module.

FIG. 5 shows a simplified top view of an exemplary second mounting device 2 without a load cell, which is additionally equipped with lateral limit stops 36. The lateral stops 36 which set additional limits on the lateral deflection of the load cell are arranged next to the mounting base 8 which serves to fasten a beam-shaped load cell (not shown here). The displaceable end of the load cell is arranged between the hooks 11 as indicated by the position of the force-transmitting element 22. In the exemplary embodiment shown here, a transverse guide element of a known design can be attached directly to a lateral limit stop 36.

The exemplary second mounting device 2 has a substantially rectangular shape wherein passage openings 4 are provided at all four corners for fastening means serving for the attachment of the second mounting device 2 to a supporting structure or a load.

For vertical limiting means (see FIG. 2) the second mounting device 2 has three passage openings or holes 13. The holes 13 are arranged at the corners of a triangle whose center is determined approximately by the position of the force-transmitting element 22. The positions of the bore 13 are approximately matched to the positions of the hooks on the first mounting device and of the overload safety device in the upright position of the weighing module. Two holes 13 are arranged next to a hook 11 and between the hook 11 and a lateral stop 36, the third hole 13 is arranged in the channel 9, on the opposite side of the first mounting device 2 relative to the mounting base 8.

Figure 6:
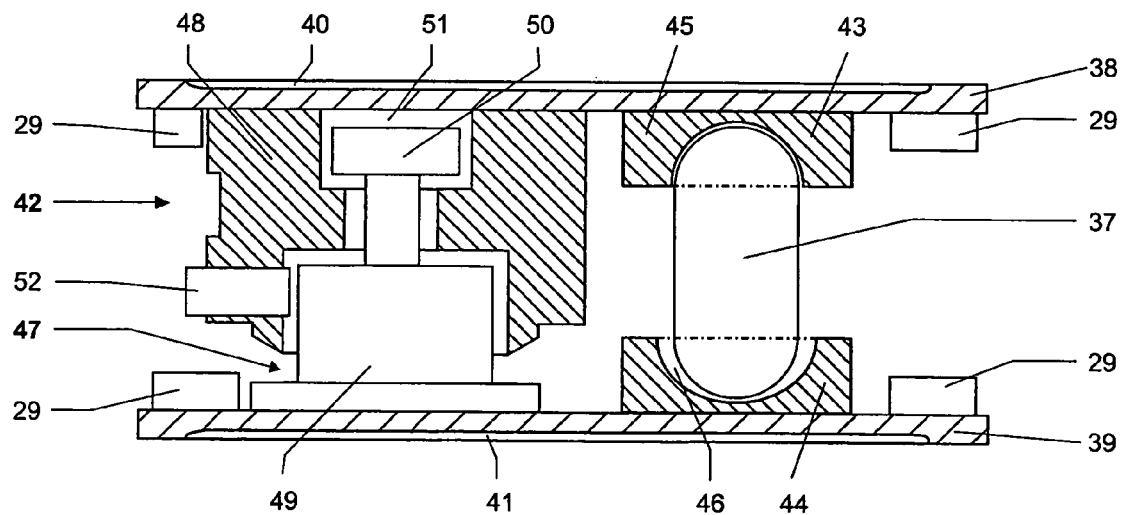
FIG. 6 represents a simplified side view of an exemplary weighing module with a rocker pin load cell shown in cross-section.

FIG. 6 shows another exemplary embodiment of a weighing module as described herein with a rocker pin load cell 37 or a corresponding dummy load cell in a simplified side view. The load cell 37 is arranged between two mounting devices 38, 39. A rocker pin load cell 37 does not have a preferred orientation for installation so that in the operating state a mounting device 38, 39 is in force-transmitting contact with the load to be measured and/or with the supporting structure. Both mounting devices 38, 39 have a surface depression 40, 41 as a means of thermal insulation on the side that faces away from the load cell 37. For the protection of the weighing module, a lift-off safety device 42 having several parts is arranged between the mounting devices 38, 39.

When the weighing module is optimally aligned and adjusted, the two mounting devices 38, 39 are in contact with each other only through the load cell 37. The load cell 37 is seated in two receiving cups 43, 44, each of which is connected to one of the two mounting devices 38, 39. Both of the receiving cups 43, 44 have concavities 45, 46 which can have either a circular or an elliptical cross-section. In the illustrated exemplary embodiment, the concavity 45 has an elliptical cross-section and the concavity 46 has a circular cross-section. Depending on the shape of the receiving cups 45, 46, it is possible to set a preferred direction for the lateral deflection of the rocker pin load cell 39.

The dimensions of the weighing module can be adapted to the desired load cell 37, allowing the use of load cells 37 with different measuring ranges, i.e., high-capacity load cells as well as precision load cells.

The lift-off safety device 42 has a lift-off safety element 47 with several parts, which is connected to the mounting device 39, and a constraining element 48 that is connected to the other mounting device 38 and constrains the lift-off safety element 47. The lift-off safety element 47 which has a plurality of parts has a base 49 and a securing pin 50 releasably connected to the base 49. The end of the securing pin 50 that is connected to the base 49 has a smaller diameter than the free end which faces towards the mounting device 38. In a correctly adjusted weighing module, the lift-off safety element 47 is constrained inside the constraining element 48 without any contact between the two. The load, for example a container that is to be weighed, can be in contact with the mounting device 38, and the mounting device 39 can be in contact with the supporting structure, but it is also possible to install the weighing module in the opposite orientation.

The two mounting devices 38, 39 can be configured in the shape of plates and can be adapted to the shape of the container to be weighed and/or to the supporting structure. For the mounting attachment of the weighing module to the container and/or to the supporting structure, both mounting devices 38, 39 have several suitable fastening means 29.

The securing pin 50 is arranged without contact in a cavity 51 in the guide element 48 and serves the purpose of preventing the weighing module from falling apart and the mounting devices 38, 39 from becoming separated.

The cavity 51 in the constraining element 48 is designed so that the lift-off safety element 47 which has several parts is constrained inside the constraining element 48 without contact and maintains a certain amount of clearance from the mounting device 38 if the weighing module is optimally aligned. Thus, the constraining element 48 represents a kind of sleeve that receives the lift-off safety element 47, wherein the shape of the cavity 51 conforms substantially to the shape of the lift-off safety element 47.

If extraneous forces disturb the weighing module, the mounting device 38 comes into contact with the securing pin 50, or in the case of laterally acting extraneous forces the parts of the lift-off safety element 47 come into inside contact with the constraining element 48, whereby the play of the weighing module is contained. Thus, the constraining element 48 acts as a horizontal as well as vertical limiting means and the securing pin 50 represents a kind of overload safety device. For the fine adjustment of the distance between the lift-off safety element 47 and the constraining element 48, there can be a plurality of limiting means 52 arranged in the constraining element 48, delimiting the distance between the lift-off safety element 47 and the constraining element 48. Preferably such limiting means 52 are adjustable, so that the amount of play can be adjusted.

Figure 7A:
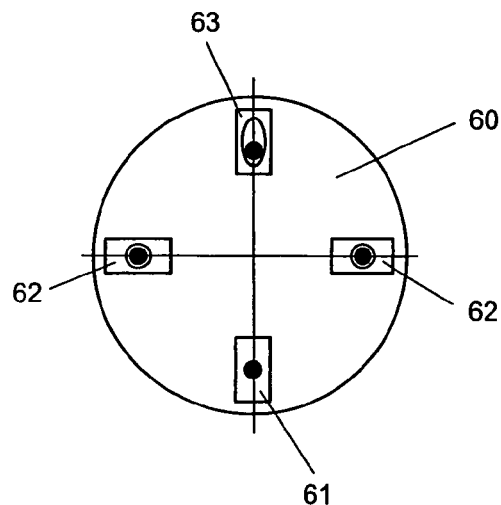
FIG. 7a represents a schematic top view of an exemplary radially oriented weighing module arrangement with four weighing modules.
Figure 7B:
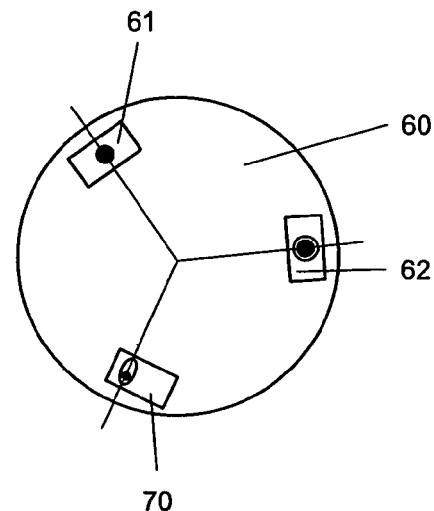
FIG. 7b represents a schematic top view of an exemplary tangentially oriented weighing module arrangement with three weighing modules.
Figure 7C:
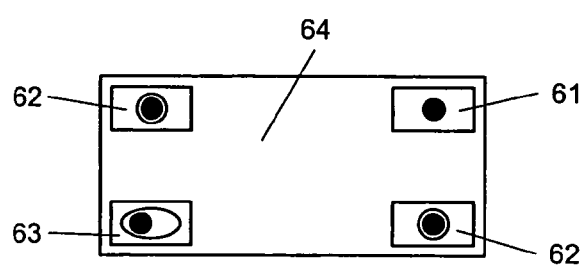
FIG. 7c represents a schematic top view of an exemplary weighing module arrangement for a rectangular container with four weighing modules.

An exemplary weighing module arrangement for the weighing of a large-volume container comprises at least three weighing modules, of which one is adjusted to be almost fixed and the others have a given amount of play. The weighing modules are oriented relative to each other depending on the shape of the container, such as the shape of the base of the container. The orientations of the individual weighing modules relative to each other are selected so that oscillations of the weighing container, extraneous disturbing forces and thermal expansion or contraction of the container will not have an influence on the weighing result. FIGS. 7*a* to 7*c* illustrate examples of different weighing module arrangements.

FIG. 7*a* shows an exemplary container 60 with a round base and a weighing module arrangement that is fixedly connected to the container 60. The weighing module arrangement comprises four radially oriented weighing modules 61, 62, 63 which are arranged at the periphery of the container 60 at 90° angles from one to the next. The longitudinal axes of the weighing modules 61, 62, 63 which are substantially rectangular in this case are oriented radially in relation to the base of the container 60. One weighing module 61 is set to be nearly fixed and serves as fixed point and/or anchoring point. Opposite this weighing module 61 is a weighing module 63 which has limited mobility in one direction. The two remaining positions are occupied by two fully movable weighing modules 62.

Due to the design of the weighing modules shown in FIGS. 1 to 6 with a force-transmitting element—more specifically, with a unit comprising a load cell and a force-transmitting element that is arranged between two receiving cups—it is possible to set the configuration of the weighing modules 61, 62 and 63 through the orientation and/or the choice of the type of receiving cups, i.e., by either setting up one of the receiving cups in a new position as envisaged with the opening shown in FIGS. 1 and 2, or by a simple exchange of one of the two receiving cups against another receiving cup. When a beam-type load cell is used, it is preferred to exchange the receiving cup that is connected to a mounting device.

A fixed weighing module 61 is realized by using two receiving cups with elliptical concavities which are arranged so that their respective longitudinal axes are aligned orthogonal to each other. A weighing module 63 with limited mobility preferably has one receiving cup with a circular concavity and one receiving cup with an elliptical concavity, which makes it possible to arbitrarily change the preferred direction of movement by rotating the elliptical receiving cup. A freely movable weighing module 62 has two receiving cups with circular concavities.

FIG. 7b likewise shows an exemplary container 60 with a round base. The weighing module arrangement which has a fixed connection to the container 60 is comprised of three weighing modules 61, 62, 70 which are aligned tangentially at the periphery of the container 60. The arrangement is composed of a fixed weighing module 61, a limited-mobility weighing module 70, and a fully movable weighing module 63, which are arranged at intervals of approximately 120° from each other in relation to the base of the container 60.

FIG. 7c illustrates an exemplary container 64 with a rectangular base. It is supported by four weighing modules 61, 62, 63 which are arranged at the four corners of the container 64. Two freely movable weighing modules 62 are arranged at diagonally opposite corners, while a fixed weighing module 61 and a limited-mobility weighing module 62 are arranged, respectively, at the other two corners.

FIGS. 7a to 7c make it clear that the various exemplary weighing modules function as supports and establish the contact between the container and the structure that supports the container. An incorrect adjustment of the weighing modules thus also has an influence on the stability of the container which must be constantly assured especially when the contents are, e.g., chemically aggressive or harmful to the environment. It is therefore necessary to design the weighing modules so that they are as stable as possible and to protect them against overloads, disturbing extraneous forces as well as the effects of torques.

Figure 8:
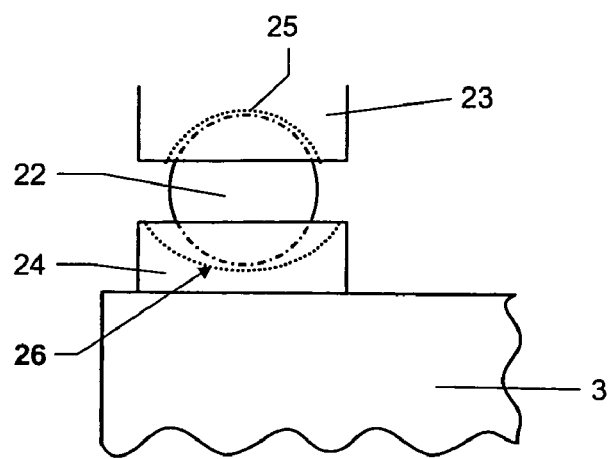
FIG. 8 represents a simplified side views of two exemplary receiving cups with a spherically shaped force-transmitting element arranged in them.
Figure 9:
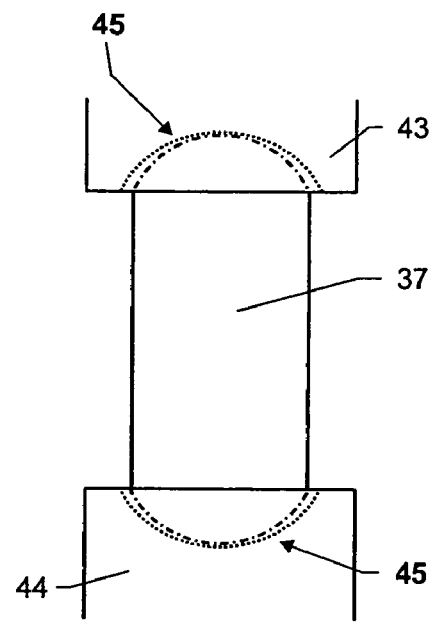
FIG. 9 represents a simplified side view of two exemplary receiving cups in which a unit has a force-transmitting element and a load cell is arranged.

FIGS. 8 and 9 show side views of the arrangements of exemplary receiving cups, force-transmitting element and load cell. Shown in FIG. 8 is a beam-type load cell 3, while FIG. 9 shows a rocker pin load cell 37 in which the force-transmitting element forms a unit with the load cell.

The exemplary load cell 3 shown in FIG. 8 is connected to an exemplary receiving cup 24. The spherical force-transmitting element 22 is arranged between the receiving cup 24 that is connected to the load cell 3 and a further receiving cup 23. The receiving cups 23, 24 have concavities 25, 26 of different cross-sectional shapes. The concavity 26 has a circular cross-section and the concavity 25 has an elliptical cross-section, wherein the longitudinal axis of the concavity 25 runs perpendicular to the drawing plane, so that the deflection of the force-transmitting element 22 is limited in the direction perpendicular to the drawing plane. A comparable effect can be achieved with two elliptical concavities that are aligned parallel to each other. The radii of both concavities are larger than the radius of the force-transmitting element 22.

The rocker pin load cell 37 shown in FIG. 9 is arranged directly between two receiving cups 43, 44 which in this representation have concavities of elliptical cross-section. The concavities 45 are aligned so that their longitudinal axes run perpendicular to the drawing plane and the play of the load cell is more strongly constrained in that direction.

Figure 10:
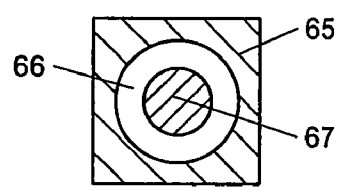
FIG. 10 represents an exemplary receiving cup with a concavity of circular cross-section in a sectional view that runs orthogonal to the direction of the load.
Figure 11:
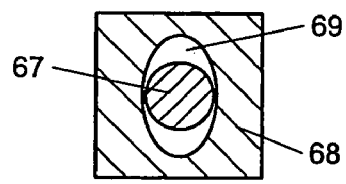
FIG. 11 represents an exemplary receiving cup with a concavity of elliptical cross-section in a sectional view that runs orthogonal to the direction of the load.
Figure 1:
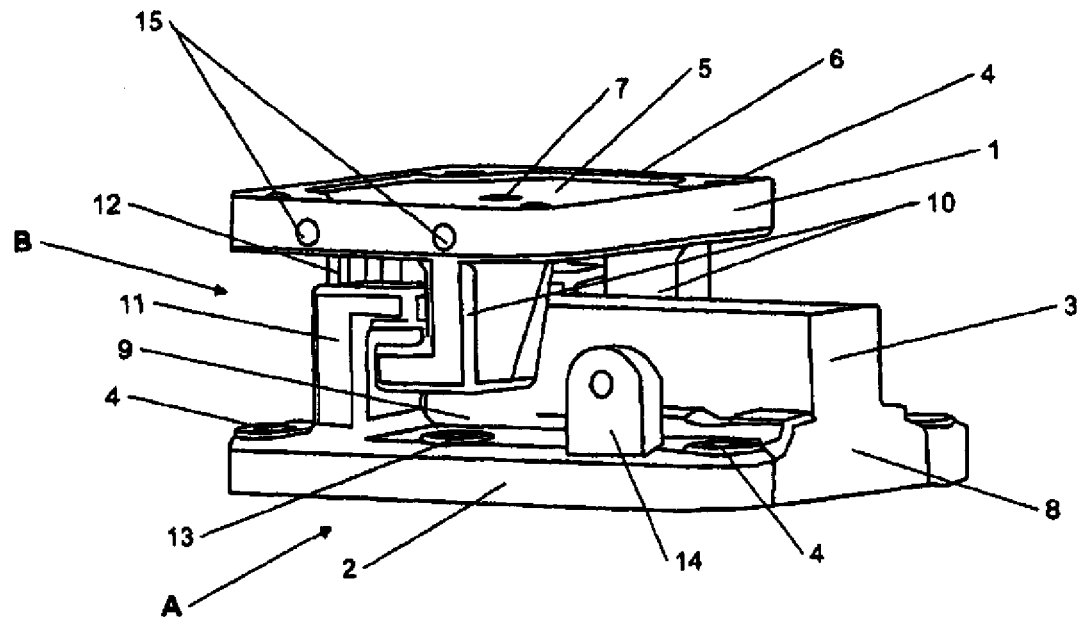
Figure 2:
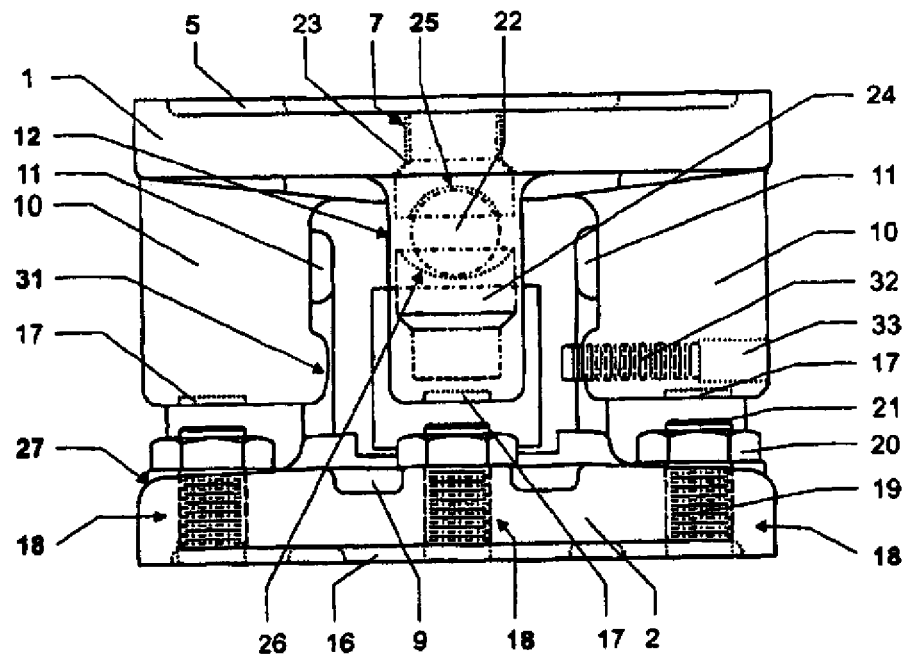
Figure 3:
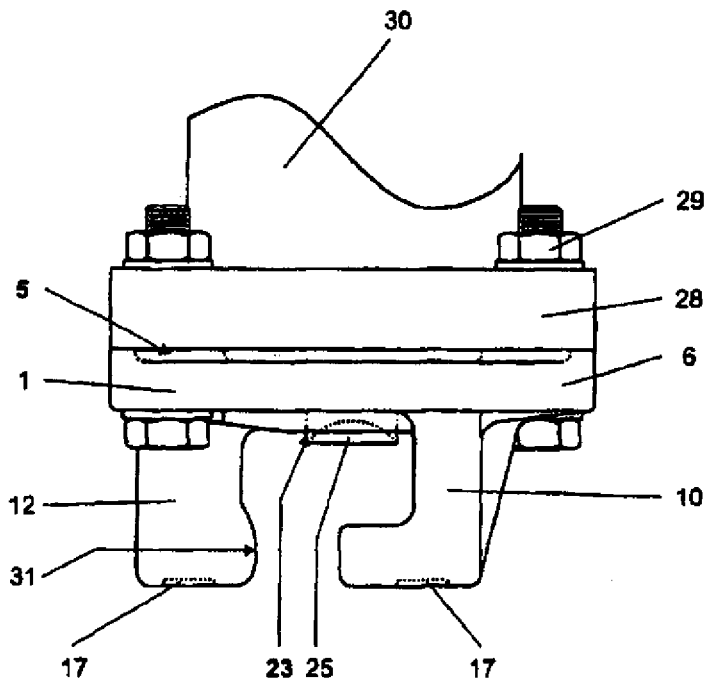
Figure 4:
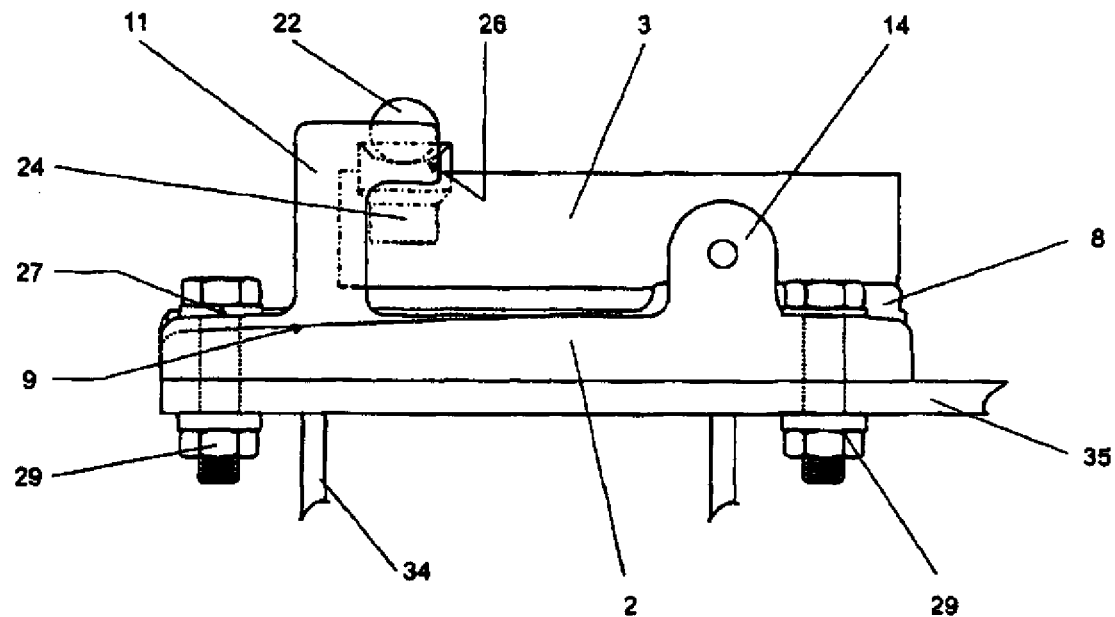
Figure 5:
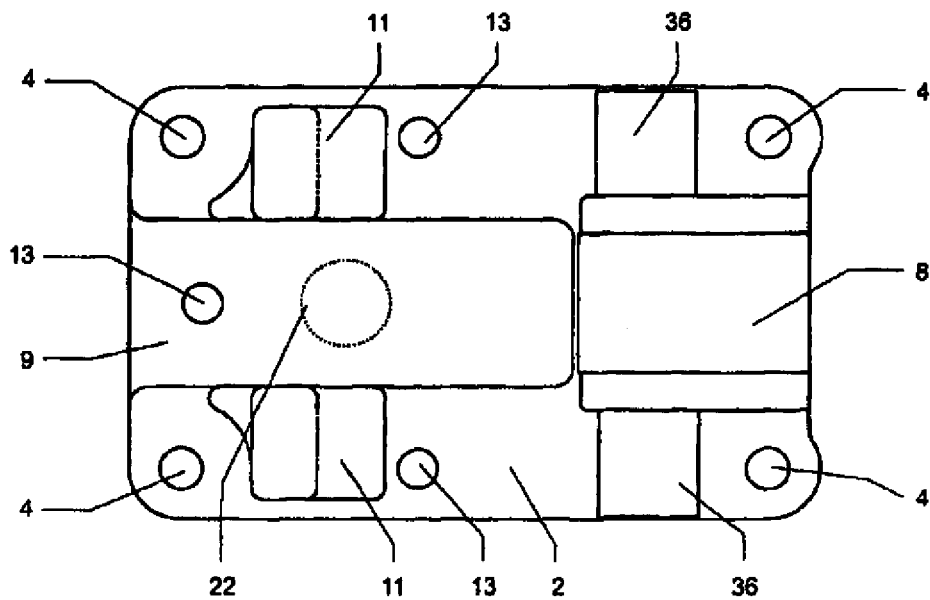
Figure 6:
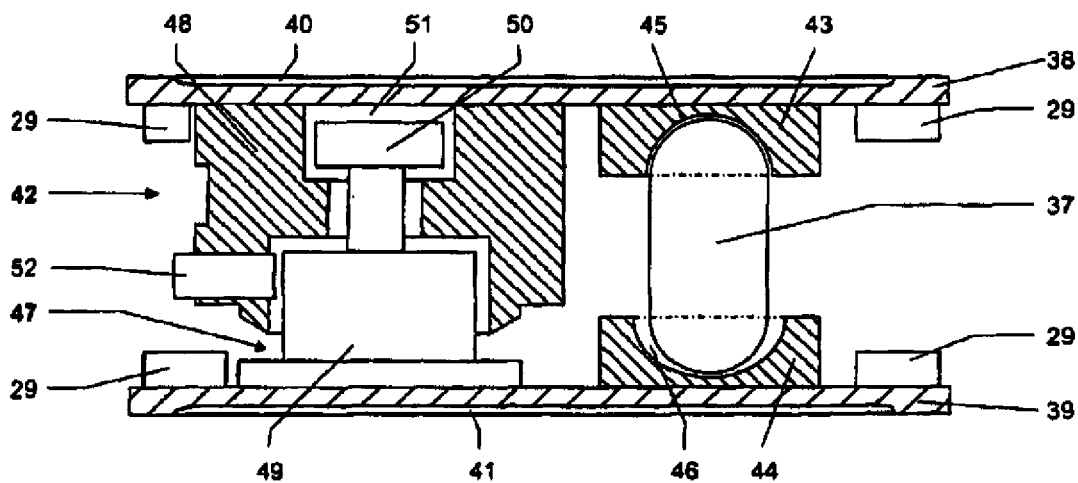

FIGS. 10 and 11, representing sectional views in a plane perpendicular to the load direction, show two exemplary receiving cups 65, 68 with concavities 66, 69 in which a force-transmitting element 67 is seated or a unit consisting of a force-transmitting element and a load cell. The receiving cup 65 shown in FIG. 10 has a concavity 66 of circular cross-section which allows the force-transmitting element 67 to move in all directions. FIG. 9 shows a receiving cup 68 with a concavity 69 of elliptical cross-section, in which case the movement of the force-transmitting element 67 is guided in a preferred direction.

By selecting the cross-sections of the concavities in the receiving cups alone, one can therefore prescribe a preferred direction of movement of the force-transmitting element and thus also of the weighing module. It is also possible to provide a weighing module exclusively with receiving cups that have elliptical concavities.

When a rocker pin load cell is used, it is also possible to shape the end surfaces of the load cell differently, for example by giving a circular cross-section to one end surface and an elliptical cross-section to the opposite end surface.

The concept of guiding and delimiting the movement of the force-transmitting element can be advantageous in cases where the weighing container is subject to oscillation and the dimensions of the container or of the load to be weighed are subject to changes as can occur for example with temperature changes.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 1 mounting device
2 mounting device
3 load cell
4 opening
5 surface depression in 1
6 ridge
7 opening
8 mounting base
9 installation aid
10 hook
11 hook
12 overload safety device
13 opening
14 fastening block
15 hole
16 depression in 2
17 recess
18 vertical limiting means
19 anchoring seat
20 head
21 limit stop
22 force-transmitting element
23 receiving cup
24 receiving cup
25 concavity in 23
26 concavity in 24
27 surface of 2
28 fastening means
29 fastening means
30 load
31 fixed horizontal limiting means
32 adjustable horizontal limiting means
33 hole
34 supporting structure
35 fastening device
36 lateral limit stop
37 load cell
38 mounting device
39 mounting device
40 depression in 38
41 depression in 39

42 lift-off safety device
43 receiving cup
44 receiving cup
45 concavity in 43
46 concavity in 44
47 lift-off safety element
48 constraining element
49 base
50 securing pin
51 cavity
52 limiting means
60 container
61 fixed weighing module
62 fully movable weighing module
63 limited-mobility weighing module
64 container
65 receiving cup
66 concavity in 65
67 force-transmitting element
68 receiving cup
69 concavity in 68
70 limited-mobility weighing module

What is claimed is:

1. Weighing module comprising:
a first mounting device which is in force-transmitting contact with a load that is to be determined;
a second mounting device which is connectable to a supporting structure that supports the weighing module; and
a load cell which is arranged between the mounting devices, wherein at least one of the mounting devices constitutes means for thermal insulation of the load cell against at least one of the load and the supporting structure and wherein the means for thermal insulation is configured in the form of at least one surface depression in the contact surface of the mounting device where the latter meets at least one of the load and the supporting structure.

2. Weighing module according to claim 1, wherein the means for thermal insulation are configured in the form of at least a passage in a mounting device, wherein said passage is arranged perpendicular to the direction of the load.

3. Weighing module according to claim 1, wherein the weighing module has at least one drainage feature.

4. Weighing module according to claim 1, wherein one mounting device has an installation aid for the load cell, which installation aid is configured in the shape of a channel.

5. Weighing module according to claim 1, wherein the load cell cooperates with a spherically shaped force-transmitting element.

6. Weighing module according to claim 5, wherein the weighing module has lateral limit stops serving to stabilize the load cell.

7. Weighing module according to claim 1, wherein the load cell and a force-transmitting element form a unit that has two convex spherical end surfaces with either the same or different geometric shapes.

8. Weighing module according to claim 1, comprising at least three weighing modules for measuring at least one of the mass of a load and a physical property of a load that can be derived from the mass, wherein said load is in force-transmitting contact with the weighing module arrangement.

9. Weighing module according to claim 2, wherein the load cell and a force-transmitting element form a unit that has two convex spherical end surfaces with either the same or different geometric shapes.

10. Weighing module according to claim 2, wherein the load cell and a force-transmitting element form a unit that has two convex spherical end surfaces with either the same or different geometric shapes.

11. Weighing module according to claim 3, wherein the load cell and a force-transmitting element form a unit that has two convex spherical end surfaces with either the same or different geometric shapes.

12. Weighing module according to claim 4, wherein the load cell and a force-transmitting element form a unit that has two convex spherical end surfaces with either the same or different geometric shapes.

13. Weighing module according to claim 1, wherein the at least one surface depression in the contact surface of the mounting device is defined by a perimeter of the contact surface.

14. Weighing module according to claim 13, wherein the perimeter of the contact surface includes ridges having holes formed therein.

15. Weighing module according to claim 1, wherein the at least one surface depression is a plurality of surface depressions separated by ridges formed on the contact surface.

16. Weighing module according to claim 1, wherein the at least one surface depression includes a plurality of supporting pads for supporting a load formed thereon.

* * * * *

UNITED STATES PATENT AND TRADEMARK OFFICE
CERTIFICATE OF CORRECTION

PATENT NO. : 7,371,978 B2  
APPLICATION NO. : 11/482155  
DATED : May 13, 2008  
INVENTOR(S) : Leahy et al.

Page 1 of 14

It is certified that error appears in the above-identified patent and that said Letters Patent is hereby corrected as shown below:

The title page, showing an illustrative figure, should be deleted and substitute therefor the attached title page.

Delete drawing sheets 1-5 and substitute therefor the drawing sheets 1-5, consisting of figures 1-12c as shown on the attached pages.

Delete columns 1 line 1 through columns 14 line 45 and insert columns 1 line 1 through columns 14 lines 47 as attached.

Signed and Sealed this
First Day of February, 2011

David J. Kappos
*Director of the United States Patent and Trademark Office*

(12) United States Patent
Leahy et al.

(10) Patent No.: US 7,371,978 B2
(45) Date of Patent: May 13, 2008

(54) THERMALLY INSULATED WEIGHING MODULE

(75) Inventors: Tom Leahy, Castelsaarasin (FR); Gregory Queen, Pickerington, OH (US); Helmut Bäumel, Greifensee (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 11/482,155

(22) Filed: Jul. 7, 2006

(65) Prior Publication Data
US 2008/0006451 A1 Jan. 10, 2008

(51) Int. Cl.
G01G 21/28 (2006.01)
(52) U.S. Cl. .............. 177/238; 73/862.622; 177/DIG. 9
(58) Field of Classification Search .............. 177/229, 177/238, DIG. 9; 73/862.622
See application file for complete search history.

(56) References Cited

U.S. PATENT DOCUMENTS

| | | | | |
|---|---|---|---|---|
| 2,714,536 A | * | 8/1955 | Wirth | 403/121 |
| 3,915,248 A | * | 10/1975 | Paelian | 177/210 R |
| 4,258,810 A | * | 3/1981 | Susor | 177/128 |
| 4,411,327 A | * | 10/1983 | Lockery et al. | 177/211 |
| 4,483,404 A | * | 11/1984 | Weihs | 177/255 |
| 4,638,876 A | * | 1/1987 | Baldwin et al. | 177/139 |
| 4,744,254 A | * | 5/1988 | Barten | 73/862.622 |
| 4,880,069 A | * | 11/1989 | Bradley | 177/211 |
| 5,929,390 A | * | 7/1999 | Naito et al. | 177/211 |
| 6,173,619 B1 | * | 1/2001 | Satake et al. | 73/862.622 |
| 6,320,142 B1 | * | 11/2001 | Burton et al. | 177/132 |
| 6,924,441 B1 | * | 8/2005 | Mobley et al. | 177/144 |
| 7,202,425 B2 | * | 4/2007 | Knudsen et al. | 177/211 |

FOREIGN PATENT DOCUMENTS

| | | |
|---|---|---|
| DE | 37 43 356 A1 | 6/1989 |
| EP | 1 275 943 A2 | 1/2003 |

* cited by examiner

Primary Examiner—Randy W Gibson
(74) Attorney, Agent, or Firm—Buchanan Ingersoll & Rooney PC

(57) ABSTRACT

Weighing module having a first mounting device which is in force-transmitting contact with a load that is to be determined, also has a second mounting device which is connectable to a supporting structure that supports the weighing module. A load cell is arranged between the mounting devices. At least one of the mounting devices is configured so that the mounting device constitutes a means for thermal insulation which thermally insulates the load cell against the load and/or against the supporting structure.

16 Claims, 5 Drawing Sheets

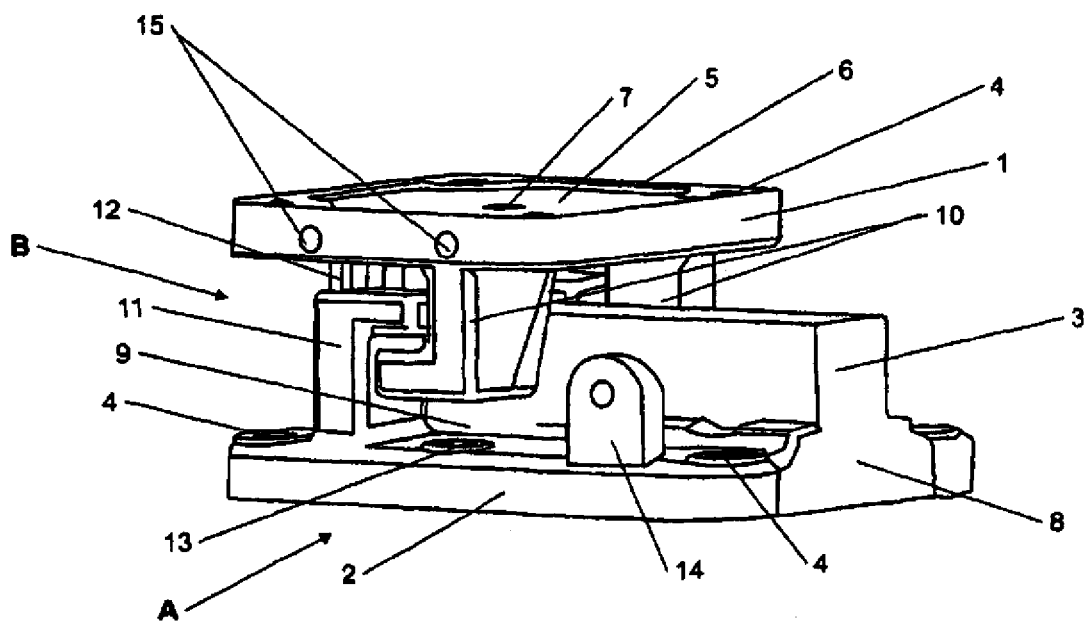

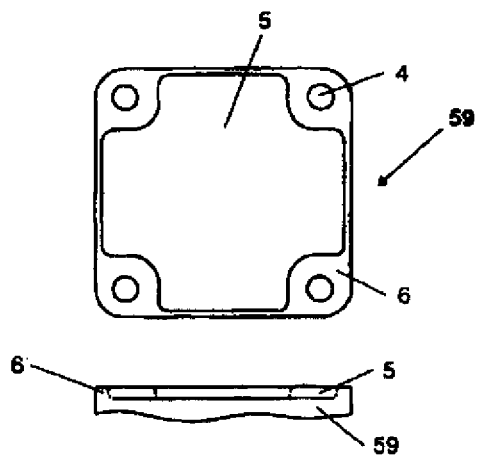
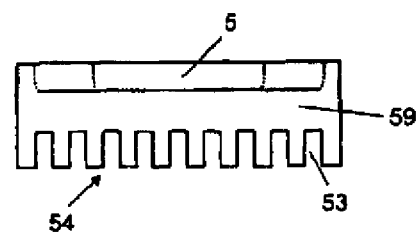
Fig. 7
Fig. 8
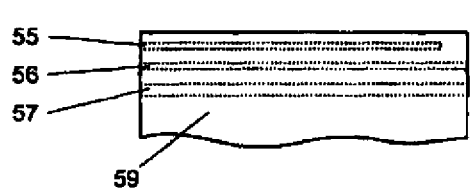
Fig. 9
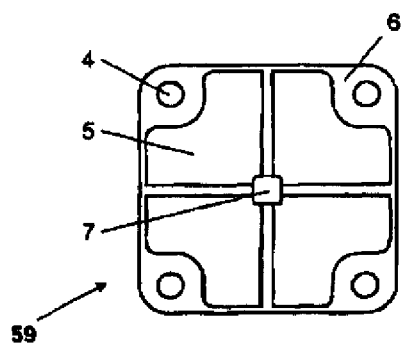
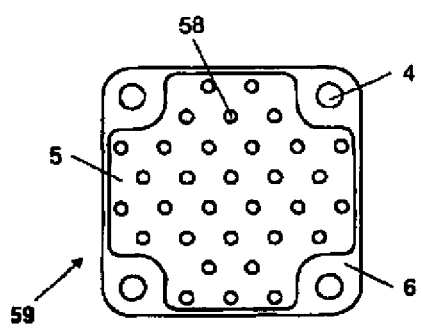
Fig. 10
Fig. 11

THERMALLY INSULATED WEIGHING MODULE

BACKGROUND

A weighing module for a load cell that is to be installed in the weighing module is disclosed.

Weighing modules can be used in diverse fields of application, depending on the type of load cell being used and on the desired load range. Weighing modules with high-capacity load cells are used primarily to determine the weight and to weigh the contents of high-volume containers, silos, tanks, reaction vessels and/or reaction containers. The weighing of the contents is generally accomplished by way of a differential weighing of the container in the empty condition and after it has been filled. Weighing modules of the type described herein can also be used under extreme ambient conditions such as for example in an open-air environment, in a technical facility or in a production plant.

Commercially available weighing modules include among others the models "Centerlign" and "Flexmount" by Mettler Toledo. The Centerlign device includes a beam-shaped load cell. The Flexmount device represents a weighing module with a beam-shaped load cell and a lift off safety feature. A load cell is arranged between two mounting devices which are designed so that weighing module can be installed between a load and a supporting structure. Beam-shaped load cells are load cells with an elongated shape. One end of the beam-shaped load cell is immovably connected to the weighing module and the other end is arranged to allow displacement under load. Besides weighing modules with beam shaped load cells there are also modules with rocker pin load cells available.

A weighing module with a beam-shaped load cell is disclosed for example in EP 1 275 943 A2, wherein the load cell cooperates with a pin-shaped or ball-shaped force-transmitting element.

The weighing modules of the known state of the art are protected primarily against mechanical damage to the weighing module and/or to the load cell. Among other features, they include lift-off safety device and/or overload safety devices with the purpose of preventing a destructive separation of a mounting devices as well as preventing a destruction of the load cell for example under excessively heavy loads. The known prior art further includes a variety of means for the alignment and/or the limitation of the free play of the weighing module and in particular of the mounting devices in relation to the load cell and to each other.

Besides an incorrect alignment of the weighing module, there are also other factors that can have an influence on the weighing result. These factors include temperature fluctuations, the effect of humidity as well as the alignment of several weighing modules relative to each other in cases where a load is to be measured with several weighing modules. Temperature fluctuations as well as humidity have an influence not only on the weighing module as a whole but primarily on the load cell.

When weighing modules are used in technical facilities or under extreme outdoor conditions, it is possible that for example rain water, condensation or even aggressive fluids may wet the weighing module, e.g. the load cell, so that its functionality is compromised or that it is attacked by the fluid. Temperature fluctuation can occur already due to an inadequately air-conditioned room, or in an outdoor situation due to daily or seasonal temperature fluctuations. Besides, temperature changes can also occur as a result of a warming or cooling of the load that is to be measured. The latter observation can be of interest in connection with the weighing of reaction containers and in production facilities, where the contents to be weighed are heated and/or cooled, or where a chemical and/or physical reaction is taking place.

For the thermal insulation, if a weighing module is thermally insulated at all, one uses primarily layers of insulating material. These insulating layers can be arranged between the weighing module and the load to be measured or between the weighing module and the supporting structure, for example between a mounting device and a fastening device that is rigidly connected to the latter, for example a foot of a container to be weighed. The insulating layers have a material with a low thermal conductivity such as for example different plastics. A disadvantage of such insulating layers is that their thickness adds to the height of the weighing module and furthermore, that over time they are subject to wear, aging, and/or becoming dislodged from their place, so that the insulating effect can be weakened in an uncontrollable manner. In some cases, the insulating layers even have to be exchanged during operation, which can require much effort and expense particularly in technical facilities as well as in weighing modules for high-capacity applications.

SUMMARY

A weighing module for a load cell has a first and a second mounting device. The first mounting device is in force-transmitting contact with a load that is to be measured, for example a container that is to be weighed, and the second mounting device can be connected with a structure that supports the weighing module. The supporting structure can be, for example, the floor of a factory building, the surface of the ground, a suitable understructure or also a table, depending on the nature of the loads for which the weighing module is designed and depending on the tasks that it needs to perform. The load cell is arranged between the two mounting devices, and during transportation or for the installation process it is advisable to exchange the load cell for a load cell dummy in order to protect the load cell.

At least one mounting device is designed so that it functions as a means for thermal insulation which thermally insulates the weighing module, e.g., the load cell, from the load and/or from the supporting structure. The means for thermal insulation can include different shapes in which the mounting device is configured.

An exemplary embodiment comprises at least one surface depression that is formed in the contact surface of the mounting device where it meets the load or the supporting structure. After the weighing module has been installed, each depression represents a hollow space which in the simplest case is filled with air. The hollow space is delimited on one side by the mounting device itself and on the other side by a fastening device which represents a part of the load or of the supporting structure. In this way, a standing air cushion with very good insulating properties is set up.

Depending on the load range, the size and the required degree of structural strength of the weighing module, the first and/or the second mounting device can have either a single surface depression or also a plurality of depressions that are delimited by material ridges and/or support pads. The hollow spaces that are created after connecting the weighing module to the supporting structure and/or to the load can be filled with air or with another substance with good insulating properties, or a vacuum can be produced in the hollow space. A vacuum can only be established if the hollow space can be closed off with a suitable cover so that it is made gas-tight.

Another exemplary embodiment of the means for thermal insulation is based on providing at least one passage running in the direction of the load in the first and/or the second mounting device. The passage can for example consist of a simple bore hole which serves the purpose of reducing the area of contact between a mounting device and the load and/or the supporting structure. A reduced contact area leads to an improvement in the insulation. The mounting device can be configured at least partially as a kind of cooling fin, which facilitates an equalization of the temperature between the weighing module and the room temperature due to the air streaming by. The mounting device can further have a fine- or coarse-meshed grid structure, which likewise reduces the contact area between the mounting device and the load or the supporting structure.

Yet another embodiment is comprised of a mounting device with at least one passage running perpendicular to the direction of the load. Passages that are arranged perpendicular to the load direction can represent a kind of tubular conduit system which can be filled for example with an insulating material and closed off towards the outside and/or can be left open, allowing for example air or another convection means to be conducted through it.

At least the first or the second mounting device can include at least one means for thermal insulation. Such means could also be provided on both mounting devices. The weighing module and the weighing can be protected in this manner from thermal influences which could be passed on by the load and/or the supporting structure to the weighing module.

In another embodiment, the weighing module has at least one drainage feature which has the purpose to drain liquids and especially moisture away from the weighing module. At least the mounting device that is connected to the supporting structure is designed for drainage in that the surface of the supporting structure that faces towards the load cell is shaped so that is slopes downward towards the outside edges, whereby moisture and liquids are directed outward, i.e., away from the weighing module.

In another embodiment, one mounting device, for example the one that is connected to the supporting structure, includes an installation aid for the load cell. The installation aid can be configured in the shape of a channel, wherein the channel is designed with a downward slope towards an outside edge of the mounting device, so that a load cell can easily be installed in the weighing module, removed from it, and/or exchanged after the mounting devices have been connected to the supporting structure and to the load.

Depending on its design, a weighing module can accommodate different types of load cells with different load ranges. The load cells that can be used can be of the type that has an elastically deformable body equipped with strain gauges and configured as a single-ended beam load cell or also as a rocker pin load cell.

In a weighing module as described herein, the load cell cooperates with a force-transmitting element which in a preferred embodiment is of spherical shape. The force-transmitting element established the force-transmitting contact between the first mounting device and the load cell. This embodiment is well suited if the weighing module is configured for a beam-shaped load cell.

In addition, a weighing module can have lateral limit stops for stabilizing a beam-shaped load cell.

In yet another embodiment, the load cell and the force-transmitting element form a unit which has two convex spherical end surfaces of either the same or different geometrical shapes. A rocker pin of the known state of the art is an example for a unit of this kind. A weighing module of this type has no preferred orientation for its installation, so that either one or the other mounting device can be connected to the load.

It is an advantage if the mobility of the weighing modules can be constrained and/or changed in a simple way. For example, if a plurality of weighing modules are used for weighing a load, in order to enable the weighing modules to absorb the effects of extraneous disturbing forces without compromising the weighing function as well as without allowing the load to tip over. Depending on the shape of the load to be determined or of the container, modules with different degrees of mobility are combined with each other especially in weighing module arrangements. A play-free or fixed module can be used as an anchoring point or fixed point together with at least two modules with full and/or limited mobility.

In an embodiment, a weighing module arrangement with at least three weighing modules is used to determine the mass or a physical quantity that can be derived from the mass of a load, for example a container and/or its contents, wherein the load is rigidly connected to the at least three weighing modules.

BRIEF DESCRIPTION OF THE DRAWING

Figure 12A:
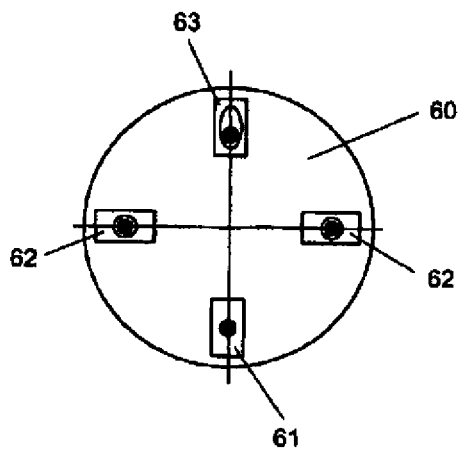
Figure 12B:
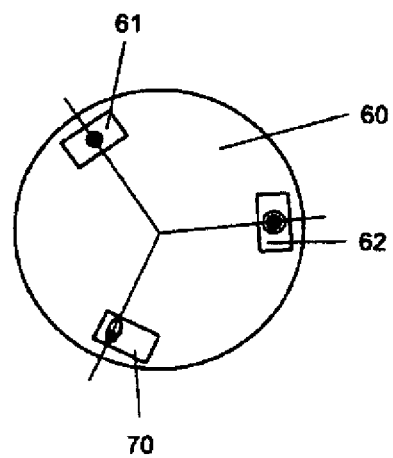
Figure 12C:
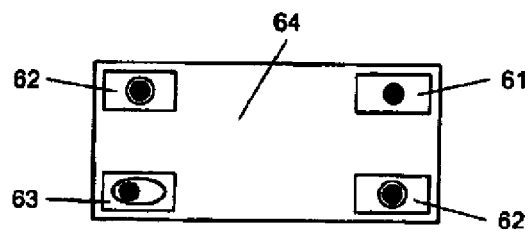

Details of the exemplary weighing modules are set forth in the description of the embodiments in conjunction with the drawings, wherein:

FIG 1 represents a simplified three-dimensional view of an exemplary weighing module;

FIG. 2 represents the exemplary weighing module of FIG. 1 as viewed in the direction A in a simplified side view;

FIG. 3 represents a simplified side view (in the direction B as indicated in FIG. 1) of a first mounting device that is connected to a fastening device, with a means for thermal insulation;

FIG. 4 represents a simplified side view (in the direction B as indicated in FIG. 1) of a second mounting device that is connected to a fastening device;

FIG. 5 represents a simplified top view of a second mounting device of an exemplary weighing module;

FIG. 6 represents a simplified side view of an exemplary weighing module with a rocker pin load cell shown in cross-section;

FIG. 7 represents a mounting device with a surface depression as an exemplary means for thermal insulation in a simplified top view and a sectional view;

FIG. 8 represents a mounting device with a surface depression and cooling fins as an exemplary means for thermal insulation in a sectional view;

FIG. 9 represents a mounting device with passages arranged perpendicular to the direction of the load from two sides in sectional views;

FIG. 10 represents a top view of a mounting device with several depressions or passages arranged in the direction of the load;

FIG. 11 represents a top view of a mounting device with a depression and with a plurality of supporting pads arranged in the direction of the load;

FIG. 12a represents a schematic top view of an exemplary radially oriented weighing module arrangement with four weighing modules;

FIG. 12b represents a schematic top view of an exemplary tangentially oriented weighing module arrangement with three weighing modules;

FIG. 12c represents a schematic top view of an exemplary weighing module arrangement for a rectangular container with four weighing modules;

DETAILED DESCRIPTION

FIG. 1 represents a simplified three-dimensional view of an exemplary weighing module as described herein. The weighing module has two substantially plate-shaped mounting devices 1, 2 and a beam-shaped load cell 3 arranged between the mounting devices 1, 2. The load cell 3 can be any kind of beam-shaped load cell or a dummy load cell. The use of a dummy is advantageous primarily during transport and/or installation of the weighing module. When in operation, the weighing module is preferably oriented so that the first mounting device 1 is in contact with a load that is to be measured and the second mounting device 2 is connected to a supporting structure.

To fasten the weighing module to the load and/or to the supporting structure, the mounting devices 1, 2 have at each corner a passage opening 4 for a suitable fastening means. An exemplary mounting device 1 that is in force-transmitting contact with a load is shown in FIG. 3, and a mounting device 2 that is connected to a supporting structure is shown in FIG. 4.

On the side that faces away from the load cell, the mounting device 1 has one large surface depression 5 extending over nearly the entire top surface of the mounting device 1. The surface depression 5 is delimited by a ridge 6 around its perimeter, wherein the top of the ridge represents the contact surface to a fastening device for the load.

A further passage opening 7 is provided approximately in the center of the surface depression 5, serving to fasten a receiving cup for a force-transmitting means that is in force-transmitting contact with the load cell 3 (see also FIGS. 2 and 3). The location of the passage opening 7 depends primarily on the way in which the load cell 3 is oriented and arranged within the weighing module.

In the operating state, the second mounting device 2 is connected to a supporting structure and is likewise equipped with a passage opening 4 at each corner for a suitable fastening means.

Arranged on the side of the mounting device 2 that faces towards the load cell 3 is a mounting base 8 on which the load cell 3 is fastened. The load cell 3 is oriented so that one end is in fixed connection to the mounting base 8. The other end is free to deflect in the direction of the load and is arranged to keep a certain distance from the mounting device, wherein the distance is determined on the one hand by the height of the mounting base 8 and on the other hand by the depth of an installation aid 9. The installation aid 9 is shaped as a channel-like depression in the mounting device 2, sloping downward from the mounting base 8 to the opposite edge of the mounting device 2. This facilitates the installation or exchange of the load cell 3 in an assembled weighing module.

During operation, the force-transmitting element alone (not visible here) establishes the force-transmitting contact between the two mounting devices 1, 2. To delimit the horizontal and vertical play of the mounting devices 1, 2 relative to each other, the weighing module includes various safety features.

A lift-off safety device is arranged between the two mounting devices 1, 2, having a plurality of parts, in this example hook-shaped means 10, 11 that mutually engage each other. Two hooks 10 are connected to the first mounting device 1, and two further hooks 11 are connected to the second mounting device 2. The hooks 10, 11 engage each other in pairs, with the load cell 3 being arranged between the two hook pairs 10, 11.

As a further safety feature, the weighing module can have an overload safety device 12 connected to the first mounting device 1, as can be seen more clearly in FIGS. 2 and 3. The hook pairs 10, 11 and the overload safety device 12 limit the horizontal play of the mounting devices 1, 2 relative to each other.

Besides the passage openings 4 for the fastening of the weighing module to a supporting structure, the second mounting device 2 also has three further passage openings 13, only one of which is visible in this view. These passage openings 13 can receive vertical limiting means which can cooperate with the hooks 10 (in the drawing directly above the passage openings 13) and with the overload safety device 12. The arrangement and function of the vertical limiting means will be explained in more detail in the context of FIGS. 2 and 5.

To weigh a container with a stirring mechanism or under difficult ambient conditions, a transverse guide element as known from the state of the art can be installed for the compensation of torques and side loads which can occur under these conditions. For the attachment of a transverse guide element, the second mounting device 2 has a fastening block 14 and the first mounting device 1 has at least one fastening device which is configured here in the form of two bore holes 15.

FIG. 2 shows a simplified side view B of the exemplary weighing module of FIG. 1. As can be clearly seen in this view, the first mounting device 1 and the second mounting device 2 each have a depression 5, 16 on the side that faces away from the load cell 3. These depressions have the purpose to provide thermal insulation of the weighing module from the load and/or the supporting structure.

The hooks 10 connected to the first mounting device 1 as well as the overload safety device 12 each have recesses 17 at their free ends, which can cooperate with vertical limiting means 18 that are arranged in the second mounting device 2. The size of the recess 17 is adapted to the vertical limiting means 18.

One vertical limiting means 18 is arranged in the second mounting device under each of the hooks 10 and under the overload safety device 12. A vertical limiting means 18 has three functional parts, i.e., an anchoring seat 19 which is arranged substantially in the second mounting device 2, a head 20 with an enlarged cross-section compared to the anchoring seat 19, and with a limit stop 21 facing towards the first mounting device 1. For example a screw with a head or a threaded rod with a suitable nut can be used as limiting means 18. The limiting means 18 are preferably designed to be adjustable so that the height of the part of the limiting means 18 that protrudes from the second mounting device 2 can be changed and the vertical play of the two mounting devices relative to each other can be adjusted.

The limiting means 18 serve not only as a limit stop for the overload safety device 12 and hooks 10 but can also cooperate with them and thus define or even fixate for example a rest position of the weighing module if the play between the two mounting devices 1, 2 is eliminated through the adjustable limiting means 18.

The force-transmitting element 22 which cooperates with the load cell 3 is arranged between the hook pairs 10, 11 and the overload safety device 12 and also between the second mounting device 2 and the load cell 3. The force-transmitting element 22 can be any of the known load receivers, but also, as shown here, a spherical element that is movably seated in two receiving cups 23, 24. The force-transmitting contact between the two mounting devices 1, 2 is established only through the load cell 3 and the force-transmitting element 22 which is free to move within the receiving cups 23, 24.

The receiving cup 23 is connected to the first mounting device 1, and the receiving cup 24 is connected to the load cell. 3. To reduce the overall height of the weighing module, the receiving cup 24 can be configured on the load cell 3. Each of the receiving cups 23, 24 has a concavity 25, 26 which can have a circular or elliptical cross-section. The receiving cup 23 in this example has a concavity 25 with an elliptical cross-section, wherein the longitudinal axis of the concavity 25 runs perpendicular to the plane of the drawing. The receiving cup 23 can be locked in place in the receiving hole 7 in the first mounting device. Preferably, the receiving hole 7 as well as the end of the receiving cup 23 that mates with the receiving hole 7 are designed with a polygonal cross-section, e.g., in a symmetric shape, i.e., a square or regular hexagon, so that the receiving cup 23 can be arranged in one of several fixed positions, which in turn allows the direction of the deflection of the force-transmitting element 22 to be prescribed in the case where this receiving cup has an elliptical concavity 25.

The other receiving cup 24 can be either rigidly connected to the second mounting device 2 and/or designed for fixation in several angular positions or, as a means of reducing the overall height of the weighing module, the receiving cup 24 can be configured on the load cell 3 and/or integrated in the latter. In FIG. 2, the concavity 26 in the receiving cup 24 is designed with a circular shape. Due to the different geometrical shapes of the receiving cups 23, 24 or, more specifically, of the elliptical concavity and the circular concavity, the mobility of the spherical force-transmitting element 22 is constrained and its deflection is guided in a preferred direction, i.e., along the longitudinal axis of the elliptical concavity 25.

To set and/or limit the horizontal play of the two mounting devices 1, 2 relative to each other, the hooks 10, 11 as well as the overload safety device 12 include fixed horizontal limiting means 31 and/or adjustable horizontal limiting means 32. The fixed limiting means 31 in the present example are simple limit stops which have been shaped directly as a part of the hook 10. An adjustable limiting means 32 can be for example a set screw or a threaded rod which runs in a passage 33 that is arranged perpendicular to the load direction. The hooks 10, 11 as well as the overload safety device 12 can be designed either with fixed horizontal limiting means 31 or with adjustable horizontal limiting means 32, where adjustable liming means 32 allow the adaptation of the weighing module to different external conditions.

FIG. 2 further illustrates the channel-shaped installation aid 9 and a drainage feature. The surface 27 of the second mounting device 2 which faces towards the load cell 3 is designed as a drainage surface which, in reference to the illustrated situation, slopes down towards the outside, so that moisture and/or liquids falling on the second mounting device 2 are quickly drained off. A comparable function is also served by the installation aid 9.

FIG. 3 shows a simplified side view of a first mounting device 1 in an orientation corresponding to the view in the direction B of FIG. 1. Two hooks 10 (with only one of them being visible in this view), the overload safety device 12 with a fixed horizontal limiting means 31, and a receiving cup 23 with an elliptical concavity 25 are arranged on the first mounting device 1. The side of the mounting device 1 which in the operating state faces away from the load cell has a surface depression 5 serving for the thermal insulation of the weighing module. The surface depression 5 is delimited by a ridge 6 around its perimeter, wherein the top of the ridge represents the contact surface for a fastening device 28.

The fastening device 28 can for example be a flange whose dimensions are matched to the mounting device 1. The fastening device 28 closes off the depression 5 at the top (in reference to the drawing), whereby an enclosed hollow space is formed. This hollow space can for example be air-free, i.e., a vacuum, or it can contain a standing air cushion, or it can also be filled with a material of a defined thermal conductivity, with a standing air cushion being preferred.

The fastening device 28 is connected to the first mounting device 1 through suitable fastening means 29. Preferred is the use of four fastening means 29 arranged, respectively, at the corners of the mounting device 1 (also see FIG. 1). These means can include screws with one nut each, as shown here, but also threaded rods with two nuts or other known means for the fastening of flanges. The fastening device 28, in turn, is connected to a load 30 shown here as the base of a container that is to be weighed.

FIG. 4 shows a simplified side view of a second mounting device 2 as seen in the direction A of FIG. 1. In the interest of clarity, the vertical limiting means (see FIG. 2) are not shown in this view.

The second mounting device 2 has two hooks 11, only one of which is visible here, a fastening block 14 for a transverse guide element, a mounting base 8 for fastening a beam-shaped load cell 3, and a channel-shaped installation aid 9 which from the mounting base 8 slopes downward towards the left side in reference to the drawing. The top surface 27 of the second mounting device 2 facing towards the load cell is shaped so that it slopes downward on all sides. The load cell 3 is connected to a receiving cup 24 with a circular concavity 26 which can receive a spherical force-transmitting element 22.

In the operating state, the second mounting device 2 is connected to a supporting structure 34 which preferably has a flange serving as fastening device 35. The mounting device 2 is connected to the fastening device 35 through suitable fastening means 29. The second mounting device 2 can, like the first-mounting device, be configured either with a means of thermal insulation or without it as illustrated here for the second mounting device 2.

FIG. 5 shows a simplified top view of a second mounting device 2 without a load cell, which is additionally equipped with lateral limit stops 36. The lateral stops 36 which set additional limits on the lateral deflection of the load cell are arranged next to the mounting base 8 which serves to fasten a beam-shaped load cell (not shown here). The displaceable end of the load cell is arranged between the hooks 11 as indicated by the position of the force-transmitting element 22. In the embodiment shown here, a transverse guide element of a known design can be attached directly to a lateral limit stop 36.

The second mounting device 2 has a substantially rectangular shape wherein passage openings 4 are provided at all four corners for fastening means serving for the attachment of the second mounting device 2 to a supporting structure or a load.

For vertical limiting means (see FIG. 2) the second mounting device 2 has three passage openings or bore holes 13. The bore holes 13 are arranged at the corners of a triangle whose center is determined approximately by the position of the force-transmitting element 22. The positions of the bore holes 13 are approximately matched to the positions of the hooks on the first mounting device and of the overload safety device in the upright position of the weighing module. Two bore holes 13 are arranged next to a hook 11 and between the hook 11 and a lateral stop 36; the third bore hole 13 is arranged in the channel 9, on the opposite side of the first mounting device 2 relative to the mounting base 8.

FIG. 6 shows another embodiment of a weighing module with a rocker pin load cell 37 or a corresponding dummy load cell in a simplified side view. The load cell 37 is arranged between two mounting devices 38, 39. A rocker pin load cell 37 does not have a preferred orientation for installation so that in the operating state a mounting device 38, 39 is in force-transmitting contact with the load to be measured and/or with the supporting structure. Both mounting devices 38, 39 have a surface depression 40, 41 as a means of thermal insulation on the side that faces away from the load cell 37. For the protection of the weighing module, a lift-off safety device 42 having several parts is arranged between the mounting devices 38, 39.

When the weighing module is optimally aligned and adjusted, the two mounting devices 38, 39 are in contact with each other only through the load cell 37. The load cell 37 is seated in two receiving cups 43, 44, each of which is connected to one of the two mounting devices 38, 39. Both of the receiving cups 43, 44 have concavities 45, 46 which can have either a circular or an elliptical cross-section. In the illustrated embodiment, the concavity 45 has an elliptical cross-section and the concavity 46 has a circular cross-section. Depending on the shape of the receiving cups 45, 46, it is possible to set a preferred direction for the lateral deflection of the rocker pin load cell 39.

The dimensions of the weighing module can be adapted to the desired load cell 37, allowing the use of load cells 37 with different measuring ranges, i.e., high- capacity load cells as well as precision load cells.

The lift-off safety device 42 has a lift-off safety element 47 with several parts, which is connected to the mounting device 39 and of a constraining element 48 that is connected to the other mounting device 38 and constrains the lift-off safety element 47. The lift-off safety element 47 which has a plurality of parts has a base 49 and a securing pin 50 releasably connected to the base 49. The end of the securing pin 50 that is connected to the base 49 has a smaller diameter than the free end which faces towards the mounting device 38. In a correctly adjusted weighing module, the lift-off safety element 47 is constrained inside the constraining element 48 without any contact between the two. Preferably the load, for example a container that is to be weighed, is in contact with the mounting device 38, and the mounting device 39 is in contact with the supporting structure, but it is also possible to install the weighing module in the opposite orientation.

The two mounting devices 38, 39 are configured preferably in the shape of plates and can be adapted to the shape of the container to be weighed and/or to the supporting structure. For the mounting attachment of the weighing module to the container and/or to the supporting structure, both mounting devices 38, 39 have several suitable fastening means 29.

The securing pin 50 is arranged without contact in a cavity 51 in the guide element 48 and serves the purpose of preventing the weighing module from falling apart.

The cavity 51 in the constraining element 48 is designed so that the lift-off safety element 47 which has several parts is constrained inside the constraining element 48 without contact and maintains a certain amount of clearance from the mounting device 38 if the weighing module is optimally aligned. Thus, the constraining element 48 represents a kind of sleeve that receives the lift-off safety element 47, wherein the shape of the cavity 51 conforms substantially to the shape of the lift-off safety element 47.

If extraneous forces disturb the weighing module, the mounting device 38 comes into contact with the securing pin 50, or in the case of laterally acting extraneous forces the parts of the lift-off safety element 47 come into inside contact with the constraining element 48. Thus, the constraining element 48 acts as a horizontal as well as vertical limiting means and the securing pin 50 represents a kind of overload safety device. For the fine adjustment of the distance between the lift-off safety element 47 and the constraining element 48, there can be a plurality of limiting means 52 arranged in the constraining element 48, delimiting the distance between the lift-off safety element 47 and the constraining element 48. Preferably such limiting means 52 are adjustable, so that the amount of play can be adjusted.

FIGS. 7 to 11 illustrate several exemplary embodiments of a means for thermal insulation. FIGS. 7, 10 and 11 show schematic top views and FIGS. 7 to 9 show side views of an exemplary mounting device with a means for thermal insulation.

FIG. 7 shows a mounting device 59 in a top view and in a side view with a surface depression 5 of the exemplary kind illustrated in FIG. 1. The surface depression 5 on the mounting device 59 is delimited by ridges 6, and the mounting device 59 has passage holes 4 for fastening means at the corners.

FIG. 8 shows a side view of a mounting device 59 with a surface depression 5 on the side which in the operating state faces away from the load cell and with a plurality of recesses 53 on the opposite side. The recesses 53 are arranged so that they form a kind of cooling fin, whereby an additional heat-removing effect is achieved due to air streaming by.

FIG. 9 shows two side views of an exemplary mounting device which instead of a depression in the surface facing away from the load cell has one or (as shown here) several passages 55, 56, 57 formed in the mounting device perpendicular to the direction of the load. The passages can be either open or closed to the outside and may be filled with a material of a given thermal conductivity. The passages 55 have only one opening to the outside. The passages 55 are of such dimensions that several passages can be arranged side-by-side in a plane. The passages 56 which are smaller than the passages 55 are comparable but pass all the way through the mounting device. The passage 57 is configured as a hollow space which extends nearly through the entire mounting device.

In principle, the passages can also be designed to run in the direction of the load, so that the means for thermal insulation is configured on the mounting device as a kind of grid structure.

FIG. 10 shows a top view of an exemplary mounting device 59 with several depressions 5 that are separated from each other by ridges 6. Approximately at the center of the mounting device illustrated here, the passage 7 can be seen which serves for the attachment of a receiving cup (also see FIG. 1).

FIG. 11 shows likewise a top view of an exemplary mounting device 59 with a surface depression 5 and a multitude of supporting pads 58. This embodiment can be advantageous for applications in the high-capacity range, because it is compatible with the design objectives of high structural stability as well as thermal insulation of the weighing module.

The embodiments of means for thermal insulation as shown in FIGS. 7 to 11 can be used in principle in all weighing modules which have a load cell and one or two mounting devices. The illustrated means can be arbitrarily combined in a weighing module and can be designed into a mounting device that is in contact with a load as well as into a mounting device that is connected to a supporting structure.

A weighing module arrangement for the weighing of a large-volume container as a rule comprises at least three weighing modules, of which one is adjusted to be almost free of play and the others have a given amount of play. The weighing modules are oriented relative to each other depending on the shape of the container, such as the shape of the base of the container. The orientations of the individual weighing modules relative to each other are selected so that oscillations of the weighing container, extraneous disturbing forces and thermal expansion or contraction of the container will not have an influence on the weighing result. FIGS. 12a to 12c illustrate examples for different weighing module arrangements.

FIG. 12a shows a container 60 with a round base and a weighing module arrangement that is fixedly connected to the container 60. The weighing module arrangement comprises four radially oriented weighing modules 61, 62, 63 which are arranged at the periphery of the container 60 at 90° angles from one to the next. The longitudinal axes of the weighing modules 61, 62, 63 which are substantially rectangular in this case are oriented radially in relation to the base of the container 60. One weighing module 61 is set to be nearly free of play and serves as a fixed point. Opposite this weighing module 61 is a weighing module 63 which has limited mobility in one direction. The two remaining positions are occupied by two fully movable weighing modules 62.

Due to the design of the weighing modules shown in FIGS. 1 to 11 with a force-transmitting element—more specifically, with a unit comprising a weighing cell and a force-transmitting element that is arranged between two receiving cups— it is possible to set the configuration of the weighing modules 61, 62 and 63 through the orientation and/or the choice of the type of receiving cups, i.e., by either setting up one of the receiving cups in a new position as envisaged with the passage opening shown in FIGS. 1 and 2, or by a simple exchange of one of the two receiving cups against another receiving cup. When a beam-type load cell is used, it is preferred to exchange the receiving cup that is connected to a mounting device.

A play-free weighing module 61 is realized by using two receiving cups with elliptical concavities which are arranged so that their respective longitudinal axes are aligned orthogonal to each other. A weighing module 63 with limited mobility preferably has one receiving cup with a circular concavity and one receiving cup with an elliptical concavity, which makes it possible to arbitrarily change the preferred direction of movement by rotating the elliptical receiving cup. A freely movable weighing module 62 has two receiving cups with circular concavities.

FIG. 12b likewise shows an exemplary container 60 with a round base. The weighing module arrangement which has a fixed connection to the container 60 is comprised of three weighing modules 61, 62, 70 which are aligned tangentially at the periphery of the container 60. The arrangement is composed of a play-free weighing module 61, a limited-mobility weighing module 70, and a fully movable weighing module 63, which are arranged at intervals of approximately 120° from each other in relation to the base of the container 60.

FIG. 12c illustrates an exemplary container 64 with an angular base. It is supported by four weighing modules 61, 62, 63 which are arranged at the four corners of the container 64. Two freely movable weighing modules 62 are arranged at diagonally opposite corners, while a play-free weighing module 61 and a limited-mobility weighing module 62 are arranged, respectively, at the other two corners.

FIGS. 12a to 12c make it clear that the exemplary weighing modules function as supports and establish the contact between the container and the structure that supports the container. An incorrect adjustment of the weighing modules thus also has an influence on the stability of the container which must be constantly assured especially when the contents are, e.g., chemically aggressive or harmful to the environment. It is therefore necessary to design the weighing modules so that they are as stable as possible and to protect them against overloads, disturbing extraneous forces and/or torques.

The concept of guiding and delimiting the movement of the force-transmitting element and thus of the play of the individual weighing module is most advantageous in cases where the container is subject to oscillations and the dimensions of the container or of the load to be weighed are subject to changes as can occur for example with temperature changes.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 1 mounting device
2 mounting device
3 weighing cell
4 passage opening
5 surface depression in 1
6 ridge
7 passage opening
8 mounting base
9 installation aid
10 hook
11 hook
12 overload safety device
13 passage opening
14 fastening block
15 bore hole
16 depression in 2
17 recess
18 vertical limiting means
19 anchoring seat
20 head
21 limit stop
22 force-transmitting element
23 receiving cup
24 receiving cup
25 concavity in 23
26 concavity in 24
27 surface of 2
28 fastening means
29 fastening means
30 load
31 fixed horizontal limiting means
32 adjustable horizontal limiting means
33 passage
34 supporting structure
35 fastening device
36 lateral limit stop
37 weighing cell
38 mounting device 39 mounting device
40 depression in 38
41 depression in 39
42 lift-off safety device
43 receiving cup
44 receiving cup
45 concavity in 43
46 concavity in 44
47 lift-off safety element
48 constraining element
49 base
50 securing pin
51 cavity
52 limiting means
53 recess
54 cooling means
55 passage
56 passage
57 passage
58 support pad
59 mounting device
60 container
61 play-free weighing module
62 fully movable weighing module
63 limited-mobility weighing module
64 container
70 limited-mobility weighing module

What is claimed is:

1. Weighing module comprising:
   a first mounting device which is in force-transmitting contact with a load that is to be determined;
   a second mounting device which is connectable to a supporting structure that supports the weighing module; and
   a load cell which is arranged between the mounting devices, wherein at least one of the mounting devices constitutes means for thermal insulation of the load cell against at least one of the load and the supporting structure and wherein the means for thermal insulation is configured in the form of at least one surface depression in the contact surface of the mounting device where the latter meets at least one of the load and the supporting structure.

2. Weighing module according to claim 1, wherein the means for thermal insulation are configured in the form of at least a passage in a mounting device, wherein said passage is arranged perpendicular to the direction of the load.

3. Weighing module according to claim 1, wherein the weighing module has at least one drainage feature.

4. Weighing module according to claim 1, wherein one mounting device has an installation aid for the load cell, which installation aid is configured in the shape of a channel.

5. Weighing module according to claim 1, wherein the load cell cooperates with a spherically shaped force-transmitting element.

6. Weighing module according to claim 5, wherein the weighing module has lateral limit stops serving to stabilize the load cell.

7. Weighing module according to claim 1, wherein the load cell and a force-transmitting element form a unit that has two convex spherical end surfaces with either the same or different geometric shapes.

8. Weighing module according to claim 1, comprising at least three weighing modules for measuring at least one of the mass of a load and a physical property of a load that can be derived from the mass, wherein said load is in force-transmitting contact with the weighing module arrangement.

9. Weighing module according to claim 2, wherein the load cell and a force-transmitting element form a unit that has two convex spherical end surfaces with either the same or different geometric shapes.

10. Weighing module according to claim 2, wherein the load cell and a force-transmitting element form a unit that has two convex spherical end surfaces with either the same or different geometric shapes.

11. Weighing module according to claim 3, wherein the load cell and a force-transmitting element form a unit that has two convex spherical end surfaces with either the same or different geometric shapes.

12. Weighing module according to claim 4, wherein the load cell and a force-transmitting element form a unit that has two convex spherical end surfaces with either the same or different geometric shapes.

13. Weighing module according to claim 1, wherein the at least one surface depression in the contact surface of the mounting device is defined by a perimeter of the contact surface.

14. Weighing module according to claim 13, wherein the perimeter of the contact surface includes ridges having holes formed therein.

15. Weighing module according to claim 1, wherein the at least one surface depression is a plurality of surface depressions separated by ridges formed on the contact surface.

16. Weighing module according to claim 1, wherein the at least one surface depression includes a plurality of supporting pads for supporting a load formed thereon.

* * * * *